US011765366B2

(12) United States Patent
Buettner et al.

(10) Patent No.: US 11,765,366 B2
(45) Date of Patent: Sep. 19, 2023

(54) METHOD FOR PROCESSING TRANSFORM COEFFICIENTS

(71) Applicant: Blackmagic Design Pty Ltd, Port Melbourne (AU)

(72) Inventors: Carsten Buettner, Port Melbourne (AU); David Bruce Owen Stanhope, Port Melbourne (AU)

(73) Assignee: Blackmagic Design Pty Ltd, Port Melbourne (AU)

( * ) Notice: Subject to any disclaimer, the term of this patent is extended or adjusted under 35 U.S.C. 154(b) by 0 days.

(21) Appl. No.: 17/313,906

(22) Filed: May 6, 2021

(65) Prior Publication Data
US 2021/0352303 A1 Nov. 11, 2021

(30) Foreign Application Priority Data
May 7, 2020 (AU) .................. 2020901460

(51) Int. Cl.
H04N 19/18 (2014.01)
H04N 19/176 (2014.01)
H04N 19/30 (2014.01)
G06T 3/40 (2006.01)
G11B 20/00 (2006.01)
G11B 20/10 (2006.01)
H04N 5/77 (2006.01)

(52) U.S. Cl.
CPC .............. *H04N 19/18* (2014.11); *G06T 3/40* (2013.01); *G11B 20/00007* (2013.01); *G11B 20/10527* (2013.01); *H04N 5/77* (2013.01); *H04N 19/176* (2014.11); *H04N 19/30* (2014.11); *G11B 2020/00072* (2013.01); *G11B 2020/10537* (2013.01)

(58) Field of Classification Search
CPC ...... H04N 19/18; H04N 19/176; H04N 19/30; H04N 5/77; G06T 3/40; G11B 20/00007; G11B 20/10527; G11B 2020/00072; G11B 2020/10537
See application file for complete search history.

(56) References Cited

U.S. PATENT DOCUMENTS 6,263,021 B1 7/2001 Sethuraman et al.
7,042,942 B2 5/2006 Chen et al.
(Continued)

FOREIGN PATENT DOCUMENTS

EP 1 446 953 1/2017

OTHER PUBLICATIONS

Partial European Search Report for Application No. 21172782.1 dated Oct. 4, 2021, 16 pages.
(Continued)

*Primary Examiner* — Sunghyoun Park
(74) *Attorney, Agent, or Firm* — SEED INTELLECTUAL PROPERTY LAW GROUP LLP

(57) ABSTRACT

Methods, software products, digital cameras and other image processing systems process a set of transform coefficients. In at least one embodiment, the method comprises, for each block of transform coefficients representing an image: ordering the block's coefficients into a sequence; encoding the ordered coefficients to yield a sequence of codewords, each codeword including one or more encoded coefficients; and dividing the sequence of codewords into two or more sub-sequences.

23 Claims, 15 Drawing Sheets

(56) References Cited

U.S. PATENT DOCUMENTS

| | | | |
|---|---|---|---|
| 8,045,810 | B2 | 10/2011 | Wu et al. |
| 8,121,428 | B2 | 2/2012 | Shen et al. |
| 8,126,280 | B2 | 2/2012 | Luh et al. |
| 10,848,730 | B2 | 11/2020 | Buettner |
| 11,258,992 | B2 | 2/2022 | Buettner |
| 11,363,246 | B2 | 6/2022 | Buettner |
| 2004/0114812 | A1 | 6/2004 | Bhaskaran et al. |
| 2007/0058713 | A1 | 3/2007 | Shen et al. |
| 2008/0253463 | A1 | 10/2008 | Lin et al. |
| 2011/0080946 | A1 | 4/2011 | Li et al. |
| 2011/0170595 | A1* | 7/2011 | Shi ............. H04N 19/176 375/E7.243 |
| 2012/0243615 | A1* | 9/2012 | Tu ............. H04N 19/162 375/240.24 |
| 2014/0112592 | A1* | 4/2014 | Kadono ......... G11B 20/1426 382/233 |
| 2015/0071359 | A1* | 3/2015 | Guo ............. H04N 19/91 375/240.18 |
| 2016/0234520 | A1 | 8/2016 | Goel |
| 2018/0063544 | A1* | 3/2018 | Tourapis ......... H04N 19/13 |
| 2018/0367775 | A1 | 12/2018 | Buettner |
| 2022/0295031 | A1 | 9/2022 | Buettner |

OTHER PUBLICATIONS

Australian Government International-type Search Report for provisional patent Application No. 2020901460 dated Feb. 1, 2021, 10 pages.

Gonzales C et al: "Flexibly scalable digital video coding", Signal Processing: *Image Communication*, Elsevier Science Publishers, Amsterdam, NL, vol. 5, No. 1-2, Feb. 1, 1993, pp. 5-20, XP026671180, ISSN: 0923-5965, DOI: 10.1016/0923-5965(93)90024-N [retrieved on Feb. 1, 1993].

Barry G Hasell et al., "MPEG-2 Scalability Techniques" In: "Digital Video: An introduction to MPEG-2", Digital Multimedia Standards Series, Jan. 1, 1999, Kluwer Academic, XP055010242, ISBN:978-0-41-208411-9, pp. 183-202.

Yuh-Reuy Lee et al., "Low-complexity DCT-domain video transcoders for arbitrary-size downscaling", 2004 IEEE 6th Workshop on Multimedia Signal Processing, Siena, Italy. Sep. 29-Oct. 1, 2004, Piscataway, NJ, USA, IEEE, Sep. 29, 2004, pp. 31-34, XP010802078, DOI: 10.1109/MMSP.2004.1436408 ISBN: 978-0-7803-8578-8.

Karuppanagounder, S. et al., "A Study on the Effect of Truncating the Discrete Cosine Transform (DCT) Coefficients for Image Compression", International Journal of Computer Science and Engineering (IJCSE) 7(4):23-30, Jun.-Jul. 2018.

Extended European Search Report for Application No. EP 21 172,782.1, dated Jan. 31, 2022, 17 pgs.

Mathew, R. et al., "Efficient layered video coding using data partitioning", Signal Processing: *Image Communication* 14(9) (1999) pp. 761-782.

International Telecommunication Union, "Advanced video coding for generic audiovisual services", ITU-T H.264, Jun. 2019, 836 pgs.

International Telecommunication Union, "High efficiency video coding", ITU-T H.265, Nov. 2019, 712 pgs.

Blackmagicdesign "Introducing Blackmagic Raw", https://www.blackmagicdesign.com/au/support/video/4c6d28aec39e4b95901fea735b5e82b4, https://www.blackmagicdesign.com/au/support/.

\* cited by examiner

BLOCK "Y0" — 525

| dc0 | ac1 | ac5 | ac6 | ac17 | ac18 | ac27 | ac28 |
|---|---|---|---|---|---|---|---|
| ac2 | ac3 | ac7 | ac12 | ac19 | ac26 | ac29 | ac42 |
| ac4 | ac8 | ac11 | ac13 | ac25 | ac30 | ac41 | ac43 |
| ac9 | ac10 | ac14 | ac15 | ac31 | ac40 | ac44 | ac53 |
| ac16 | ac20 | ac24 | ac32 | ac39 | ac45 | ac52 | ac54 |
| ac21 | ac23 | ac33 | ac38 | ac46 | ac51 | ac55 | ac60 |
| ac22 | ac34 | ac37 | ac47 | ac50 | ac56 | ac59 | ac61 |
| ac35 | ac36 | ac48 | ac49 | ac57 | ac58 | ac62 | ac63 |

505

BLOCK "Y1"

| dc0 | ac1 | ac5 | ac6 | ac17 | ac18 | ac27 | ac28 |
|---|---|---|---|---|---|---|---|
| ac2 | ac3 | ac7 | ac12 | ac19 | ac26 | ac29 | ac42 |
| ac4 | ac8 | ac11 | ac13 | ac25 | ac30 | ac41 | ac43 |
| ac9 | ac10 | ac14 | ac15 | ac31 | ac40 | ac44 | ac53 |
| ac16 | ac20 | ac24 | ac32 | ac39 | ac45 | ac52 | ac54 |
| ac21 | ac23 | ac33 | ac38 | ac46 | ac51 | ac55 | ac60 |
| ac22 | ac34 | ac37 | ac47 | ac50 | ac56 | ac59 | ac61 |
| ac35 | ac36 | ac48 | ac49 | ac57 | ac58 | ac62 | ac63 |

METHOD FOR PROCESSING TRANSFORM COEFFICIENTS

BACKGROUND

Technical Field

The present disclosure relates to methods, systems and software products for processing transform coefficients, such as the discrete cosine transform (DCT) coefficients that result from transforming spatial domain image data into a frequency domain. More specifically, the present disclosure relates to methods, systems and software products for encoding transform coefficients in a manner that facilitates efficient decoding and storage, particularly of downscaled versions of the original spatial domain image data. Methods and systems for decoding image data, and generating images therefrom are also disclosed.

Description of the Related Art

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

Most professional and consumer-grade digital cameras utilize a single image sensor that captures color images by optically filtering incoming light with a color filter array (CFA). The CFA is configured to capture light of one of three colors (typically red, green and blue) at each of the image sensor's photosites. As each photosite only has information about a single color, a process of interpolation (or "demosaicing") is required to supply the two "missing" colors channels to each photosite. This process generally increases the volume of image data by a factor of three when working with tri-chromatic image acquisition. Additionally, further processing is usually required (including white balancing, color transformation, noise reduction and tone mapping) before the image can be rendered on a display in a viewable form.

Such processing flows can be performed directly on the camera's hardware prior to compressing the processed data for storage and/or later playback. Various compression techniques have been developed including the MPEG and H.26X standards, and the "Blackmagic RAW" format developed by the assignee of the present disclosure. These techniques are based on dividing the input image into fixed-size spatial domain image data blocks (e.g., N×N, M×N blocks of pixels) and transforming the image data of each block into a block of transform coefficients. One common method involves using a discrete cosine transform (DCT) to generate corresponding frequency domain blocks of data with the same number of coefficients as the corresponding spatial domain block (e.g., blocks of N×N or M×N DCT coefficients). Following DCT transformation, each frequency domain block's data is quantized and entropy encoded yielding a series of codewords representing the compressed blocks of spatial frequencies. The codewords for all blocks are concatenated into a sequence of codewords representing the whole image, which may be stored or transmitted for subsequent decoding. Professional cameras often also allow image data to be stored in its 'raw' form (i.e., data from the image sensor that has not been demosaiced). This allows certain processing decisions (such as the particular demosaicing algorithm that is to be used) to be postponed, for example to the time of post-production. But even in this case the same encoding process can be performed.

Some aspects of the post-production workflow (such as editing and color grading) do not always require the image to be displayed at the full resolution at which it was captured by the image sensor. However, as images are invariably stored in an encoded form (primarily to compress the image data), even when only a lower resolution image is required, it is still necessary to perform a full-resolution decode before the image can be opened and downscaled to be viewed at a lower resolution. This problem is becoming more pronounced with the high resolution image capture capabilities of modern digital cameras.

One approach to downscaling (i.e., generation of a lower resolution image) involves reducing the dimension of the blocks of transform coefficients to below the block size used during encoding. This block size reduction is applied to data that has undergone at least some form of decompression; typically during the decoding phase. To further decode the data into a displayable form, an inverse transform (e.g., an IDCT) is performed on the reduced-sized blocks to generate correspondingly reduced-sized blocks of spatial data. This is illustrated in FIG. 1, which respectively shows the correspondence between the size of frequency domain blocks and their resultant spatial data blocks after applying a corresponding inverse DCT transformation. FIG. 1 shows:
  the generation of a full scale N×N spatial block (2) from an N×N frequency domain block (3);
  the generation of a half scale (N/2×N/2) spatial domain block (4) from a corresponding half scale N/2×N/2 frequency domain block (5); and
  the generation of a quarter scale (N/4×N/4) spatial domain block (6) from a corresponding N/4×N/4 frequency domain block (7).
  In each case, the scaled down DCT blocks (5,7) are shown relative to the full scale DCT block (3) to illustrate their relative scale.

United States Pre-Grant Publication No. 20040114812 describes an alternative approach to downscaling, in the form of a matrix transform that directly generates pixel data for a downscaled image from a set of transform coefficients output from an inverse DCT.

The present disclosure aims to take an alternative approach to processing transform coefficients, including for the purpose of storage and/or producing downscaled versions of the original image data prior to DCT transformation.

BRIEF SUMMARY

According to a first aspect of the present disclosure, there is provided a method for processing a set of transform coefficients, comprising:
  dividing the transform coefficients into a plurality of blocks; and
  for each block:
    ordering the block's coefficients into a sequence;
    encoding the ordered coefficients to yield a sequence of codewords, each codeword including one or more encoded coefficients; and
    dividing the sequence of codewords into two or more sub-sequences.

The transform coefficients may be divided into a plurality of blocks by generating divided blocks of transform coefficients from corresponding, distinct spatial regions of an image, i.e., spatial blocks or tiles defined in an image being encoded. By using the approach of dividing the sequence of codewords (each of which includes one or more encoded transform coefficients) into separate sub-sequences of codewords (or 'sub-streams'), the present disclosure (at least in preferred embodiments) allows lower-resolution images to be efficiently generated from transform coefficients that are still in encoded form. Unlike the prior art techniques described above, the present disclosure does not always require an entire image to be decoded in order to produce a lower-resolution image.

Also, by using the approach of dividing the sequence of codewords into separate sub-sequences, the original image data can still be encoded in a single pass. In one form, the disclosure can be implemented using a single entropy encoder without adding any additional computational complexity. The disclosure also retains compression efficiencies associated with encoding coefficients as a single block, as opposed to encoding separate groups of sub-blocks.

Preferably, the number of codewords in each sub-sequence, and the number of encoded coefficients contained in each codeword, is at least partly determined by a downscaling ratio. In other words, the coefficients that are required to produce a lower resolution image at a particular downscaling ratio are allocated to a separate sub-sequence or to multiple sub-sequences. For example, for a 1/2 downscaling ratio, approximately 25% of the coefficients could be allocated to a first sub-sequence and the remaining 75% of the coefficients allocated to a second sub-sequence that would not need to be entropy decoded. Thus a downscaling process which generates an image at a downscaling ratio of 1/2, or less (i.e., 1/4, 1/8, etc.) need not decode the second sub-sequence.

In some embodiments, the ordering of a block's sequence of coefficients is a modified zigzag ordering comprising a permuted region and a zigzag-ordered region. The use of a modified zigzag ordering (zigzag being the standard ordering used in entropy encoding) essentially groups the coefficients in a more efficient manner. The coefficients are encoded sequentially following the order of the zigzag pattern, and the modified zigzag pattern advantageously arranges the transform coefficients into a sequence so that coefficients that define sub-blocks (of transform coefficients) which correspond to chosen downscaling ratios are encoded together. This has the advantage that during decoding, coefficients that are not required for generating the downscaled image are less likely to be decoded. In turn, this reduces or eliminates the performance bottleneck spent in performing unnecessary decoding operations (such as entropy decoding, and inverse DCT operations.)

According to some embodiments, each block is of dimension N×N and the zigzag-ordered region includes the coefficients on and below a diagonal of each block.

According to another aspect of the present disclosure, there is provided a method for decoding an encoded image file producing using an embodiment of the first aspect of the disclosure. The method includes:
  selecting an image resolution;
  selecting one or more sub-sequences suitable to generate an image at the selected resolution; and
  decoding the selected sub-sequences.

According to another aspect of the present disclosure there is provided a non-transitory computer readable medium containing a computer software product including instructions which, when executed by a processor, cause the processor to process a set of transform coefficients, by performing an embodiment of the first aspect of the disclosure.

According to another aspect of the present disclosure, there is provided a method for storing a frame of image data, comprising:
  transforming the frame of image data into a set of transform coefficients; and processing the transform coefficients using an embodiment of the first aspect of the present disclosure; and storing selected ones of the sub-sequences. All of the sub-sequences (or fewer than all of the sub-sequences) can be stored.

Preferably, the sub-sequences selected for storage are selected on the basis of a downscaling ratio. In other words, sub-sequences that contain only the coefficients that produce a downscaled image of desired ratio when decoded, are selected for storage. Other sub-sequences generated during the encoding can be discarded.

The present disclosure also provides a non-transitory computer readable medium containing a computer software including instructions which, when executed by a processor, cause the processor to perform the method according to this aspect of the disclosure.

In a fifth aspect of the disclosure, there is provided a method for processing a set of transform coefficients,
  said transform coefficients being arranged into a plurality of blocks, each block representing a spatial region of an image; and the method comprising:
    for each block:
      ordering the block's coefficients into a sequence of coefficients;
      encoding the ordered sequence of coefficients to yield a sequence of codewords, each codeword including one or more encoded coefficients; and
      dividing the sequence of codewords into two or more sub-sequences of codewords.

The number of coefficients in each sub-sequence can be at least partly determined by a downscaling ratio.

Dividing the sequence of codewords into two or more sub-sequences of codewords can comprise defining a first sub-block of transform coefficients based on a first downscaling ratio, and allocating codewords into a first sub-sequence of codewords until the first sub-sequence of codewords contains all codewords needed to recreate the first sub-block of transform coefficients by decoding the first sub-sequence of codewords.

Dividing the sequence of codewords into two or more sub-sequences of codewords can further comprise defining a second sub-block of transform coefficients based on a second downscaling ratio, and allocating codewords, that are not in the first sub-sequence of codewords, to a second sub-sequence of codewords until the combination of the second sub-sequence of codewords and first sub-sequence of codewords contains all codewords needed to recreate the second sub-block of transform coefficients by decoding said combination of codewords.

The method can further include defining a first sub-block of transform coefficients based on a corresponding downscaling ratio and dividing the sequence of codewords to form a first sub-sequence of codewords that contains those codewords necessary to decode the first sub-block of transform coefficients. It may further include defining a second sub-block of transform coefficients based on a corresponding downscaling ratio and dividing the sequence of codewords to form a second sub-sequence of codewords that contains codewords which, when they are combined with the codewords contained within the first sub-sequence of codewords, are necessary to decode the second sub-block of transform coefficients. It may also further include defining a third sub-block of transform coefficients based on a corresponding downscaling ratio and dividing the sequence of codewords to form a third sub-sequence of codewords that contains codewords which, when they are combined with the codewords contained within the first and second sub-sequence of codewords, are necessary to decode the third sub-block of transform coefficients. In any of these embodiments, the method may include dividing the sequence of codewords to form a third sub-sequence of codewords that contains codewords which, when they are combined with the codewords contained within the first and second sub-sequence of codewords, are necessary to decode the third sub-block of transform coefficients. In any of the aforementioned implementations, dividing the sequence of codewords into two or more sub-sequences of codewords may further comprise allocating remaining codewords corresponding to a block to at least one further sub-sequence of codewords.

In all of the above-mentioned embodiments of the fifth aspect of the disclosure, a block of transform coefficients may comprise an array of M×N transform coefficients, where N may, or may not, equal M; and at least one of said sub-sequences of codewords represents a sub-block of transform coefficients comprising an array of M/D×N/D transform coefficients, wherein 1/D is a downscaling ratio of the sub-block.

In some embodiments, dividing the sequence of codewords into two or more sub-sequences of codewords includes:

creating a sub-sequence of codewords that include enough codewords to regenerate a sub-block of transform coefficients comprising M/D×N/D transform coefficients, wherein 1/D is a downscaling ratio of the sub-block.

The ordering of each block's coefficients into said sequence of coefficients can be a modified zigzag ordering comprising a permuted region and a zigzag-ordered region. In this case, if each block is of dimension N×N the zigzag-ordered region preferably includes the coefficients on and below a diagonal of each block.

The method of any of the above embodiments may further include arranging corresponding sub-sequences for the plurality of blocks into a common sub-sequence. In this case, the method can include storing an image file containing one or more of said common sub-sequences. The method may further include storing a plurality of common sub-sequences in said image file to enable generation of a downscaled image at least one predetermined downscaling ratio that corresponds to a respective common sub-sequences.

In a sixth aspect of the present disclosure, there is provided a method for decoding an encoded image produced using a method according to an embodiment of the fifth aspect of the disclosure. This method can include:

selecting an image resolution;
selecting one or more sub-sequences of codewords suitable to generate an image at the selected image resolution; and
decoding the selected sub-sequences.

For each block representing a spatial region of the image the method may include; decoding fewer than all of the sub-sequences to produce a sub-block of transform coefficients having fewer transform coefficients than the block prior to encoding.

In a further aspect of the present disclosure, there is provided a method for generating a downscaled image from encoded image data, said encoded image data having been generated by a method according to an embodiment of the first or fifth aspects of the disclosure. The method can comprise:

selecting an image resolution;
for each block representing a spatial region of the image:
decoding fewer than all of the sub-sequences of codewords to produce a sub-block of transform coefficients having fewer transform coefficients than the block prior to encoding;
performing an inverse transformation on the sub-block of transform coefficients using an inverse transformation sized to generate spatial domain image data corresponding to the selected image resolution;
processing the spatial domain image data for each sub-block to generate a downscaled image at the selected image resolution.

The sub-block of transform coefficients may have a number of coefficients corresponding to the selected image resolution.

In the above embodiments, the method can include reordering the sub-block of transform coefficients prior to performing the inverse transformation, wherein the reordered sub-block of transform coefficients is in a zigzag pattern.

A further aspect of the present disclosure relates to a non-transitory computer readable medium containing a computer software product including instructions which, when executed by a processor, cause the processor to perform an embodiment of the methods method disclosed herein.

A further aspect of the present disclosure relates to a method for storing a frame of image data, comprising:

transforming the frame of image data into a set of transform coefficients;
performing an encoding method according to an embodiment of either of the first or fifth aspects set out above; and
storing one or more of the sub-sequences of codewords.

The one or more sub-sequences of codewords are preferably stored in a manner to facilitate retrieval of selected ones of said sub-sequences of codewords. Although it should be noted that all sub-sequences may be stored in some embodiments to enable a full resolution decoding to be performed.

As used herein, except where the context requires otherwise, the term "comprise" and variations of the term, such as "comprising", "comprises", and "comprised", are not intended to exclude further additives, components, integers, or steps.

Further aspects of the present disclosure and further embodiments of the aspects described in the preceding paragraphs will become apparent from the following description, given by way of example and with reference to the accompanying drawings.

BRIEF DESCRIPTION OF THE SEVERAL VIEWS OF THE DRAWINGS

FIG. 9 is an illustration of two blocks of transform coefficients ordered in accordance with embodiments of the disclosure.

DETAILED DESCRIPTION

Embodiments of the present disclosure will now be described with reference to specific examples, but the scope of the disclosure should not be considered as being limited to such examples.

Figure 1:
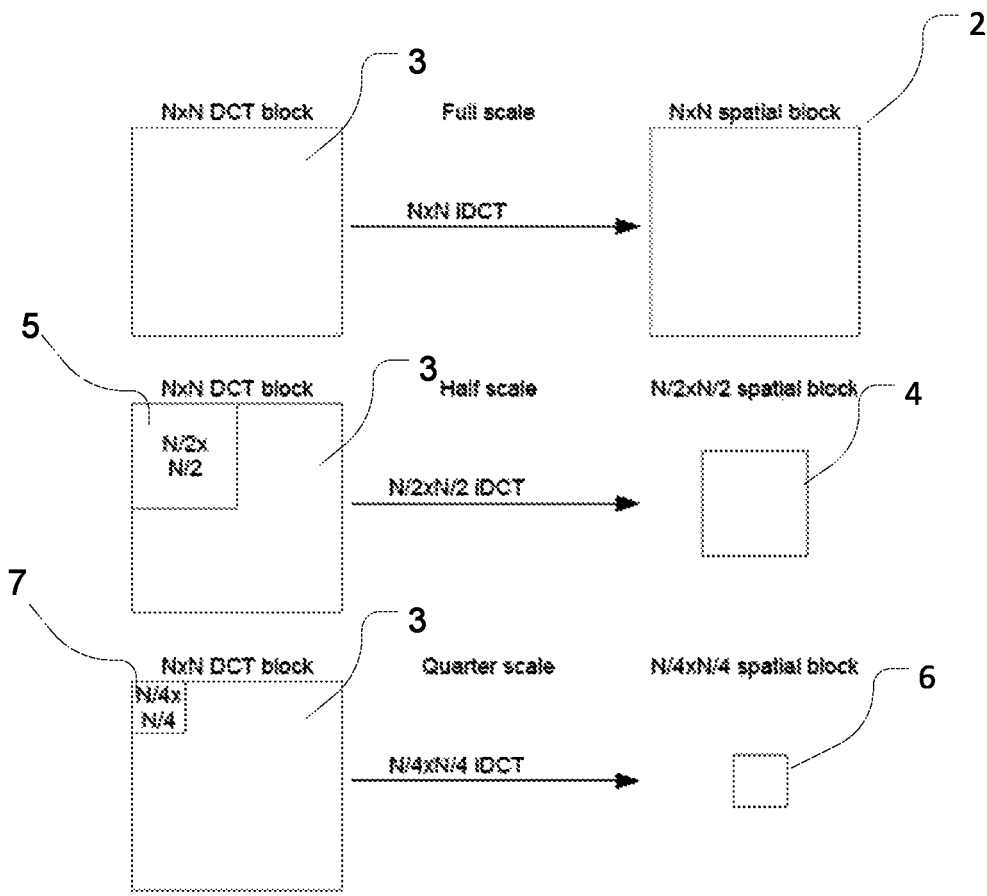
FIG. 1 is a block diagram illustrating prior art approaches to image downscaling in the frequency domain (DCT domain)
Figure 2:
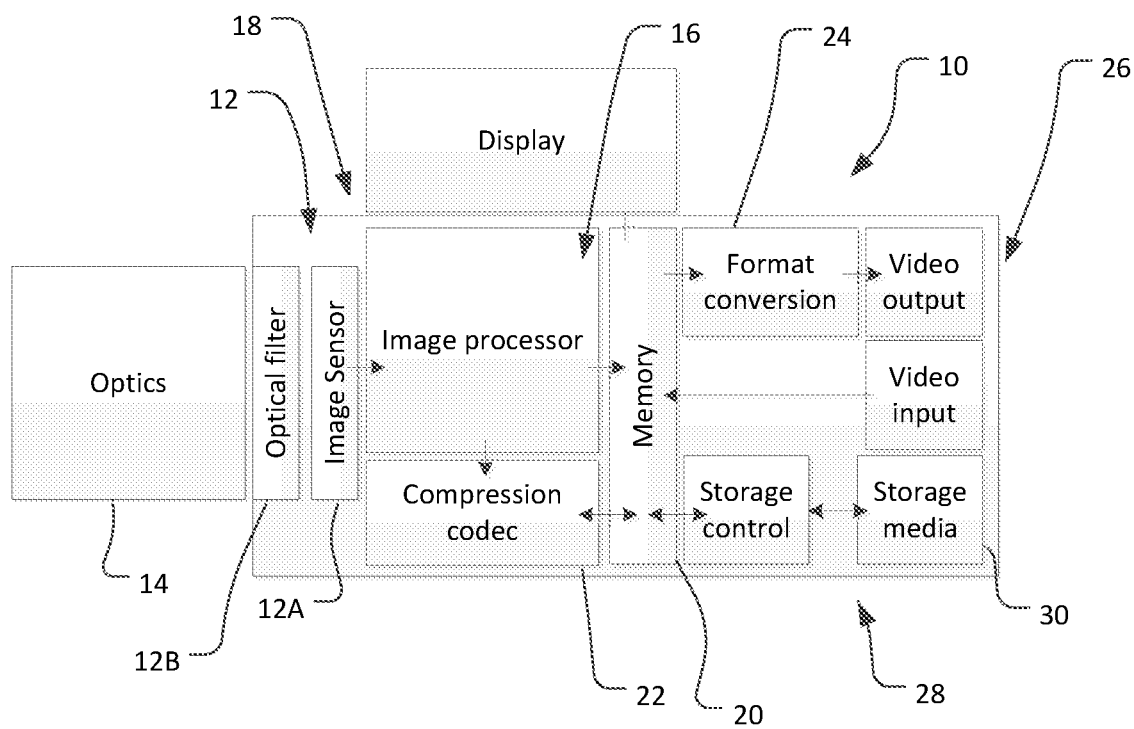
FIG. 2 is a schematic illustration of a digital camera.

FIG. 2 is a schematic representation of a camera 10 capable of implementing methods according to the present disclosure. However, those skilled in the art will realize that the methods according to the present disclosure (include encoding and decoding operations) can be implemented in software running on general and special purpose computing hardware. For example, methods according to the present disclosure can be readily integrated into video and image editing software.

The camera 10 includes an image capture system 12 configured to convert received light into image data. In this example, the image capture system 12 includes an image sensor 12A (e.g., a CCD or CMOS image sensing chip or similar) and associated optical filter 12B (e.g., an IR cut-off filter or an optical low pass filter). An optical system 14, e.g., lens is also provided to form images on the image sensor. The image sensor will typically (if it is not a monochromatic camera) include a color filter array (CFA), in the form of a spatial array of color filters, placed in front of the image sensor chip to enable capture of color images. The filters of the CFA are spatially correlated with photosites of the single image sensor, so that each photosite has a corresponding spectrally selective filter. In this example, the CFA used is a Bayer CFA with alternating red, green and blue color filters, although the techniques of the present disclosure are not limited to use with any specific optical system or CFA, and maybe used with monochromatic imaging systems also.

The image data that is generated by the image capture system 12 comprises an array of pixel values corresponding to the level of light received at each photosite of the image sensor 12A. The image data is passed to the image processing subsystem 18. The image processing subsystem 18 may comprise one or more data processors, such as an ASIC or FPGA or microprocessor with associated software, and is configured to perform a range of image processing tasks. Working memory 20 is provided to enable temporary storage of data or software or the like during image processing and other tasks.

The image processing subsystem 18 also includes a video encoding system 22. The video encoding system 22 will typically be implemented by providing software configured to enable a processor (or FPGA or ASIC) to implement one or more video codecs. This system can be used to encode and compress the image data into a desired format including by the methods according to the present disclosure.

The image processing subsystem 18 may also include a format conversion system 24 which processes image data into a format (such as Y'CbCr) that is better able to be transmitted over a video transmission system 26 or that is more convenient for downstream processing. The format conversion system 24 is provided to format the image into one of said video transmission formats to enable transmission, before being passed to the video transmission system 26. This can include transcoding image data from its original format into (one of) an appropriate video transmission format of the video transmission system 26.

The video transmission system is operable to transmit (and optionally receive) video output data (such as to an external video recorder or recorder/monitor) via a video interface having at least a video output port. The video interface can be bi-directional and thus also include a video input port. As an example, the video interface could be an SDI interface or other like interface.

The camera also includes a data storage system in the form of a memory control subsystem 28 which is configured to control persistent storage of video data (and any other data) on a local non-volatile memory 30. The local memory 30 may use a removable memory such as a memory card or removable hard drive. However, in the general case the memory control subsystem 28 is arranged to transmit and/or receive control signals to/from the local memory 30 to control storage and retrieval of video data on the memory 30 and also to perform any processing or formatting of data for storage. The memory 30 could be a solid state drive operating according to the Serial ATA protocol, in which case the memory control subsystem will operate to control operation of the SATA drive and manage reading and writing of data to it.

It should be noted that, embodiments of the present disclosure, including aspects involving encoding and decoding of image data can be performed on a wide variety of devices, for example:

a computing system (e.g., laptop, desktop computer, server or cloud computing platform) running software for that processes or displays images or video, including but not limited to; image/video playback; image/video editing, such as non-linear editing systems; image/video color correction; computer gaming; computer game making; AR and VR systems:

video processing hardware such as video transcoders; cameras; video storage devices; cameras; video switchers, and the like.

Figure 3:
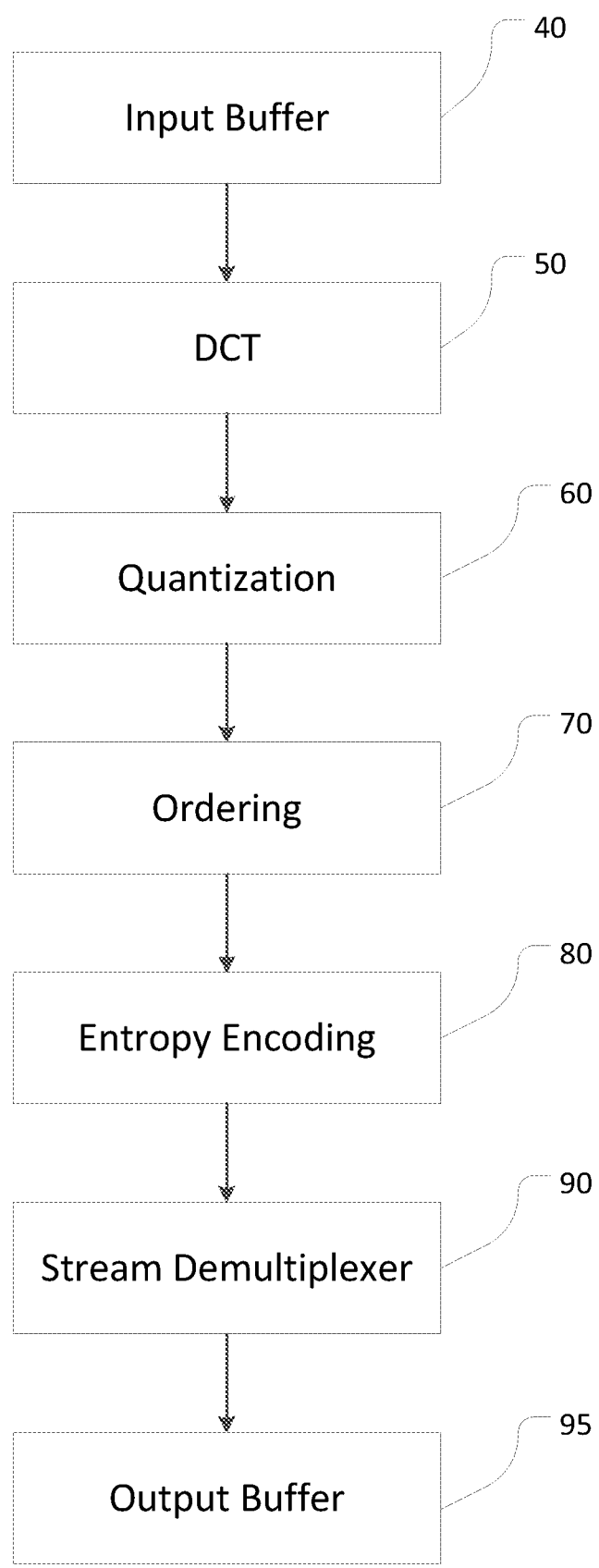
FIG. 3 is a flow chart of the encoding phase of a method in accordance with an embodiment of the present disclosure.

A method of processing image data according to an embodiment of the current disclosure is illustrated by the flowchart of FIG. 3. The method commences at step 40 with the receipt of spatial domain image data into an image buffer such as the video encoding system 22. The image data will include a series of pixel values representing an image frame. Each pixel value will be expressed with a given bit depth. The bit depth of the pixel values will determine the precision to which the received light level will be expressed within the dynamic range of the image sensor.

The spatial domain image data can be arranged in a wide variety of formats. For example, it may be:

arranged in a bitstream e.g., set out in the order in which it is read out of the image sensor;

separated into color planes where the pixel values corresponding to pixels with the same CFA filter color (i.e., pixels of the same color) are grouped together;

demosaiced, and arranged into full resolution color plane images; and processed into one or more luminance and chrominance images, which may or may not be compliant with a color space definition such as a member of the YCbCr family of color spaces.

In the present example, the image data arriving at the input buffer 40 is in the Blackmagic RAW format described in United States Pre-Grant No. 2018/0367775, assigned to the assignee of the present disclosure. In the case of Blackmagic RAW, the image data will include image data representing a luminance image at the full resolution of image sensor 12A and two lower-resolution chrominance images. Those skilled in the art will appreciate that the method of the present disclosure can be performed on image data in other formats, such as other raw formats and RGB or YUV data.

At step 50, the image data of each of the luminance and chrominance images is transformed (step 50) using a discrete cosine transform (DCT). Such transformation involves first splitting each of the luminance image and the two chrominance images into blocks of a suitable spatial dimension (such as 8×8). Most commonly, the spatial domain blocks will have dimensions chosen from the following dimensions, but other dimensions are also able to be used:

8×8 pixels; 12×12 pixels; 4×8 pixels; and 6×12 pixels.

The specific block size and shape used can be chosen depending on a range of factors such as: the size of the image sensor; the expected frequency components in the image; the processing characteristics of the device processing the image (e.g., processing and/or memory capacity); processing speed requirements; and desired image quality.

Each block is then converted to a frequency-domain representation, using a suitable transformation, such as the DCT. Before computing the DCT of each block, its values may be shifted to ensure a range centered on zero. Application of the DCT yields a block having a top-left corner entry (or DC coefficient) that is often of relatively larger magnitude that defines the block's basic intensity level. The remaining coefficients in the block are known as the AC coefficients.

The DCT blocks are next quantized (step 60) by reference to a suitable quantization matrix. The quantization operation divides each DCT coefficient in the block by an assigned constant value and rounds the result to the nearest integer value. The quantized block of coefficients are typically smaller in magnitude than the coefficients prior to quantization. Typically, many of the higher frequency coefficients are rounded to zero (i.e., zero is the nearest integer to the input coefficient after it has been divided by the assigned constant value in the quantization matrix).

Figure 4A:
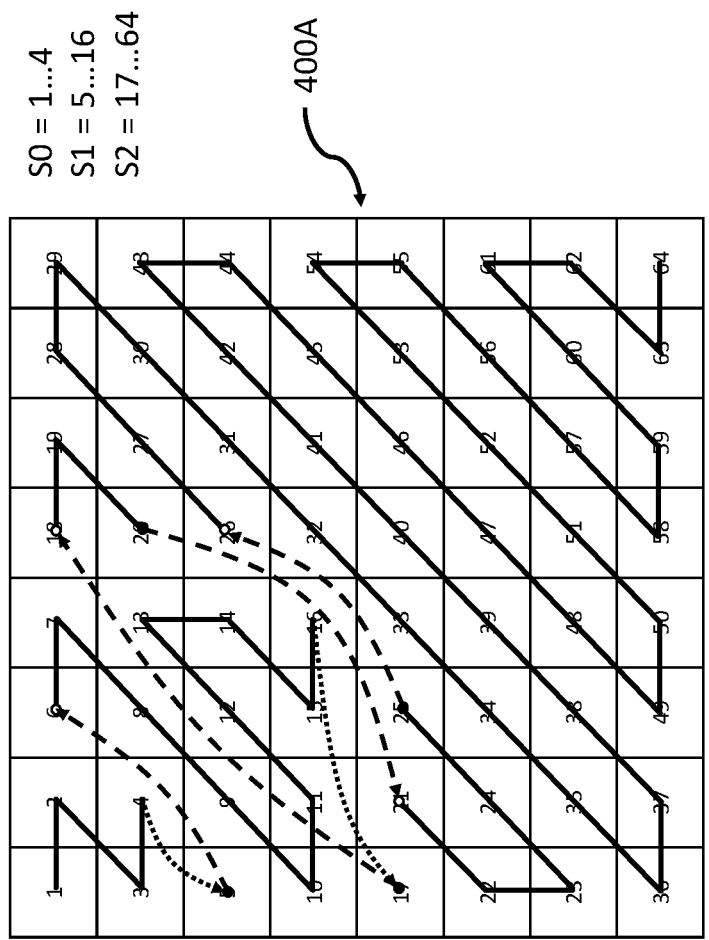
FIGS. 4A and 4B illustrate exemplary modified zigzag patterns for 8×8 and 12×12 DCT coefficient matrixes that are able to be used in embodiments of the present disclosure.
Figure 4B:
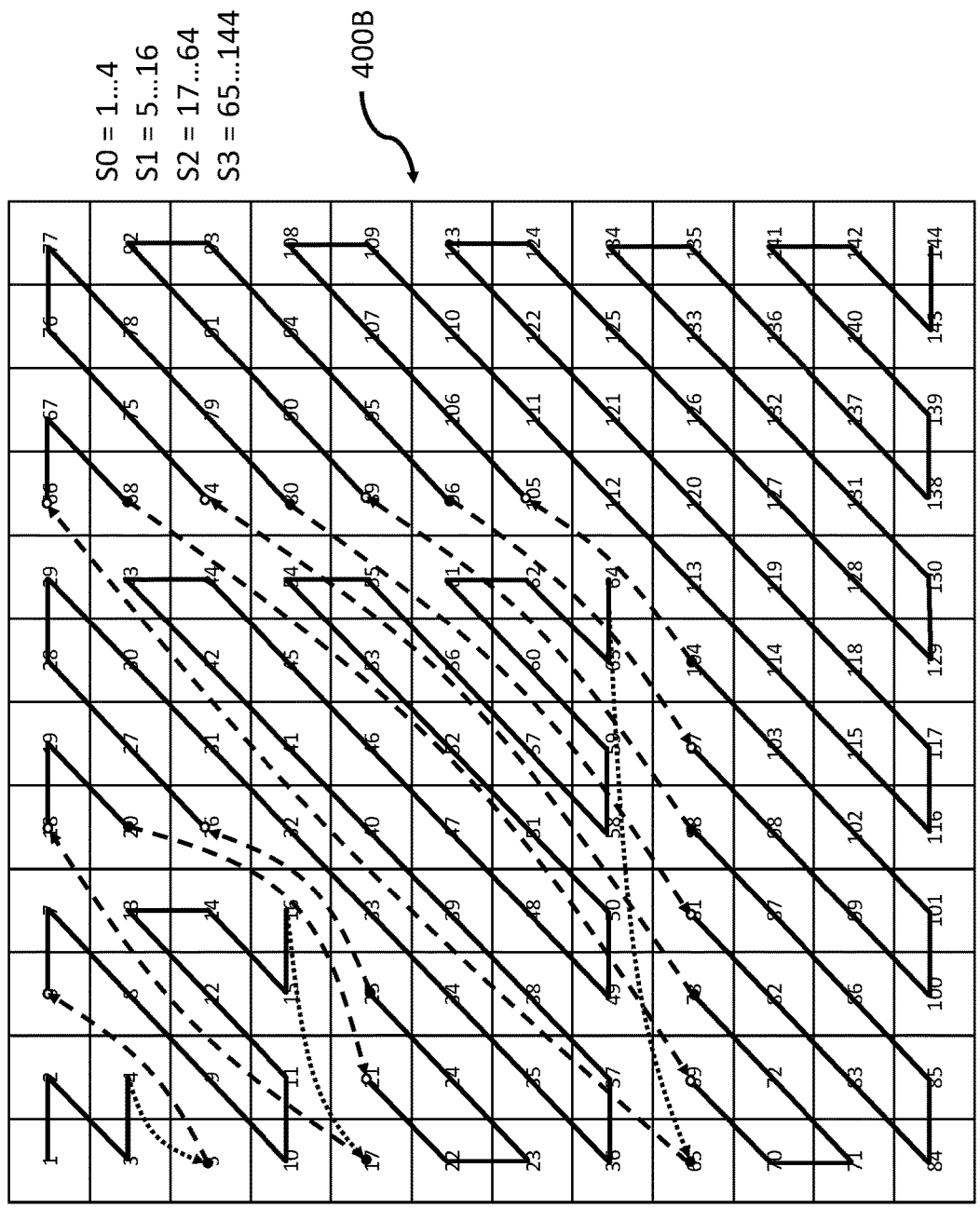

After quantization, the quantized coefficients of each block are arranged in a designated order (step 70). According to preferred embodiments, a modified zigzag ordering is used. An exemplary modified zigzag ordering for an 8×8 block and a 12/12 block are as illustrated in FIGS. 4A and 4B respectively. In both figures, the zigzag order starts from the DC coefficient (1) in the top left corner and progresses through the coefficients in the order indicated numerically. To aid visualization of the zigzag ordering, the path of the order is indicated in solid lines in FIGS. 4A and 4B.

A conventional zigzag pattern (shown for an 8×8 block in FIG. 4C and for a 12×12 block in FIG. 4D) begins with the DC coefficient and then progresses to successive neighboring coefficients along a series along oppositely directed diagonal paths. The first diagonal path begins with the coefficient that is horizontally adjacent the DC coefficient. When the pattern reaches the edge of the coefficient matrix, it progresses to the nearest adjacent coefficient that lies on the edge of the coefficient matrix, then turns and progresses by successive coefficients along the next diagonal line of coefficients.

Unlike the conventional zigzag pattern (FIGS. 4C and 4D), the modified zigzag pattern (FIGS. 4A and 4B) has discontinuities at which one or both of the following occurs:

the zigzag pattern progresses to a non-neighboring coefficient;

the zigzag pattern changes the direction of progression at a coefficient that is not at the edge of coefficient matrix.

In this manner, the modified zigzag pattern of FIGS. 4A and 4B create a series of sub-blocks. The zigzag pattern appears to traverse a series of squares of coefficients having a common origin at the DC coefficient. The nested squares increase in size from a 2×2 square; to a 4×4 square, then 8×8 square, etc. Each sub-block in this example contains those transform coefficients between successive squares, i.e., all coefficients within the square, except those already allocated to an earlier sub-block. Different numbers of such nested squares could be defined. The discontinuity in the zigzag pattern can thus be a jump to begin a new square in the zigzag (illustrated by a dotted arrows from coefficients 4 to 5, 16 to 17 in FIGS. 4A and 4B, and 64 to 65 in FIG. 4B) or a discontinuity to skip coefficients that lie along the same diagonal path but which that have already appeared in an earlier square the zigzag pattern (shown as dashed arrows e.g., from coefficients 5 to 6, 17 to 18, 20 to 21, etc., in FIGS. 4A and 4B).

Figure 5:
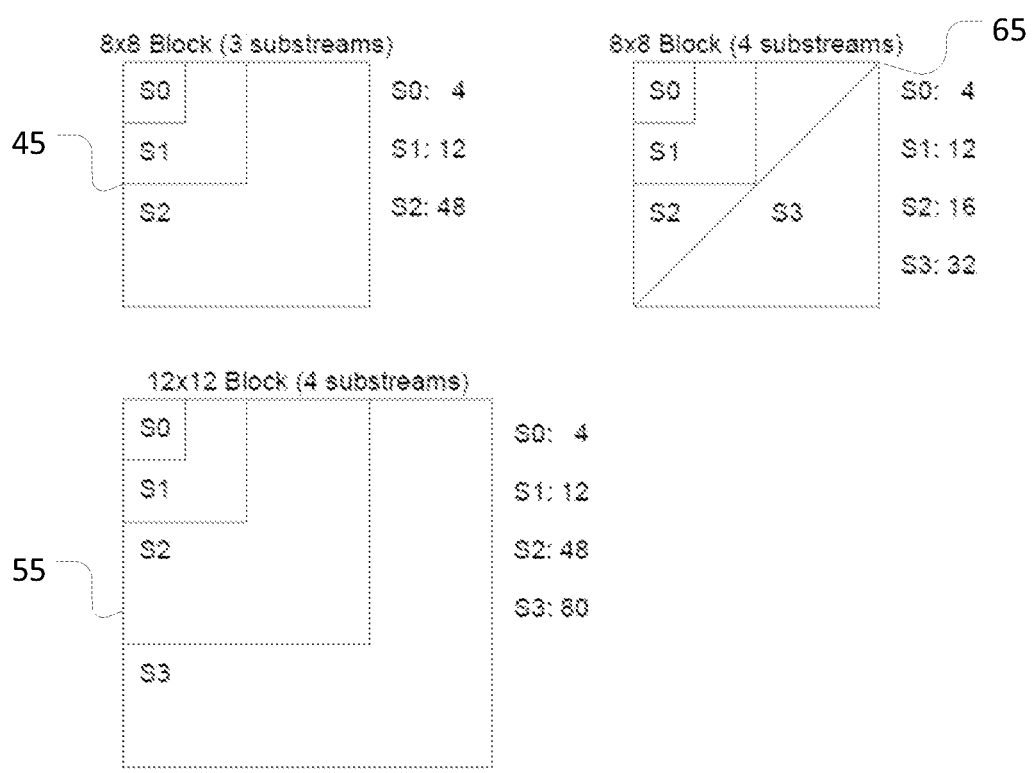
FIG. 5 is a block diagram illustrating various sub-sequence generation methodologies.

Other shaped sub-blocks shapes are also possible, for example: the sub-block corresponding to sub-sequence S2 in block 65 of FIG. 5; in an embodiment in which the blocks used to divide the image are rectangular (i.e., blocks have dimensions of M×N, and M≠N) the sub-blocks are also preferably also have the same shape.)

As can be seen in FIGS. 4A and 4B, the modified zigzag orderings comprise a permuted region and a region having the standard zigzag-ordering. In the case of an 8×8 block shown in FIG. 4A, the diagonal of coefficients extending between the bottom left (coefficient 36) and top right of the block (coefficient 30), and the diagonals below, are in standard zigzag ordering, with the remainder of the block comprising the permuted region. The permuted region contains the nested squares of coefficients discussed above, and any coefficients surrounding them that lie along the same diagonal.

At step 80, each coefficient in the ordered sequence of coefficients is encoded. Huffman encoding is preferred, however other encoding techniques can also be used. Run-length encoding can also be applied to the coefficient sequence prior to Huffman encoding. Run-length encoding can improve the compression ratio by storing multiple entries of the same value as a count (i.e., the number of times the value is repeated) and the value itself. It is preferred to limit the use of run-length encoding to runs of zeros that result from the quantization of the higher-frequency AC coefficients. In addition, as run-length encoding can sometimes increase the amount of data requiring storage (i.e., in the absence of long runs of repeated values), it can be suitably omitted from the encoding process.

Huffman encoding the ordered sequence of coefficients involves assigning a unique codeword to each non-zero coefficient in the input. Runs of zero value coefficients are typically indicated by the codeword for the next non-zero coefficient (or by the codeword for the end of block). The codewords generated by Huffman encoding are of variable length in accordance with the probability of occurrence of each coefficient. The resulting code is both uniquely decodable and instantaneous (i.e., prefix-free).

Assignment of a codeword to each non-zero coefficient in the ordered sequence results in a stream of ordered codewords.

Huffman encoding has been found to be suitably efficient for encoding raw image data.

At step 90, this serial stream of codewords is divided by a Stream Demultiplexer (executing on video encoding system 22) into a number of separate sub-streams. The stream demultiplexing function can also be integrated into other functional units of the encoder, such as the Huffman encoder or an output buffer.

In an alternative embodiment, the coefficients are divided by the Stream Demultiplexer into separate sub-streams before being encoded (i.e., the order of steps 80 and 90 in FIG. 3 are reversed). According to this embodiment, the stream demultiplexer separates the coefficients into sub-sequences that can be processed and/or encoded separately. Such an embodiment may need multiple encoders to encode the plurality of sub-sequences of coefficients. However, the number of encoders may not need to match the total number of sub-sequences generated by the demultiplexer, if shorter sub-sequences can share an encoder while at least one longer sub-sequence has a dedicated encoder.

Typically, the Stream Demultiplexer is operative to construct the individual sub-sequences by reference to one or more downscaling ratios. The downscaling ratios are preferably selected to facilitate improved decoding efficiency in generating downscaled versions of the image.

Three examples of how transform coefficients in a block of can be mapped to different sub-sequences are illustrated in FIG. 5. Three examples are shown as follows:

Example 45, which defines three sub-sequences for an image having 8×8 transform coefficient blocks;

Example 65 which defines four sub-sequences for an image having 8×8 transform coefficient blocks; and Example 55 which defines four sub-sequences for an image having 12×12 transform coefficient blocks.

However, other block sizes and numbers of sub-sequences can be used on other embodiments of the present disclosure.

Turning firstly to the case of an 8×8 block (example 45). In this example, the first sub-sequence (S0) encodes to the first DCT coefficient (i.e., the DC coefficient) and the number of AC coefficients that are required to produce a block size that corresponds to predetermined a downscaling ratio. A 1/4 downscaling ratio for an 8×8 block of coefficient means that a 2×2 sub-block of coefficients must be encoded in the sub-sequence S0, so a minimum of 3 AC coefficients and the DC coefficient are required in sub-sequence S0.

The next sub-sequence (S1) corresponds to a lower downscaling ratio (e.g., a downscaling ratio of 1/2) and contains codewords encoding the number of additional AC DCT coefficients that are required to produce a sub-block having dimension corresponding to the downscaling ratio. To produce a sub-block suitable to generate an image downscaled by ½, a 4×4 coefficient sub-block is encoded into S1. In this example, the codewords in S0 encode 12 coefficients, and when combined with the codewords of S0 may decode the required 16 coefficients.

The remaining 48 coefficients are assigned to the third sub-sequence S2. FIG. 5 also illustrates a sub-sequence construction methodology applied to a 12×12 block (example 55). In this case, sub-sequence S0 encodes sufficient coefficients to produce a block size corresponding to a 1/6 downscaling ratio, being a 2×2 block of DCT coefficients; S1 encodes sufficient coefficients to when combined with S0 enables a block size corresponding to a 1/3 downscaling ratio to be produced, which is a 4×4 block of DCT coefficients; and S2 encodes sufficient coefficients that in combination with S0 and S1 a block size corresponding to a 2/3 downscaling ratio can be decoded, i.e., an 8×8 block of DCT coefficients. S3 includes all remaining coefficients needed to generate a 12×12 block of coefficients to enable recreation of a full resolution image.

FIG. 5 further illustrates an alternative sub-sequence construction methodology applied to an 8×8 block (example 65) which generates 4 sub-sequences. In this example, sub-sequences S0 and S1 are as per example 45. In this case, sub-sequence S2 includes has sufficient coefficients allocated to it to that in combination S0 and S1 can recreate at least all DCT coefficients above the major diagonal of the 8×8 coefficient block. Thus it includes 16 coefficients, and a sub-sequence S3 includes 32 coefficients.

This sub-sequence allocation method may advantageously produce sub-sequences with more even numbers of codewords to maximize processing efficiency. This methodology can enable a doubling of the processing speed in a real-time implementation as it guarantees that the largest sub-sequence (i.e., substream S3) does not have more than half of each block's coefficients.

The sub-sequences described in connection with FIG. 5 are described in terms of DCT coefficients (although they result from of any suitable transform), however the sub-sequences generated by step 90 in the embodiment of FIG. 3 in fact contain sequences of codewords.

As will be exemplified below, the use of run-length encoding may mean that an earlier sub-sequence will encode transform coefficients designated as falling into a following sub-sequence. Thus a given sub-sequence (when it is combined with all earlier (typically lower frequency component) sub-sequences) will include enough data (either codewords or DCT coefficients if encoding has not yet occurred) to recreate a transform coefficient block of a predetermined size. Preferably the size corresponds to a specific downscaling ratio. For a given block being encoded, a sub-sequence may be empty if the applicable encoding scheme is such that the entire contents of that sub-sequence can be encoded into a lower numbered sub-sequence without inefficiency in encoding the earlier sub-sequence, e.g., a run of zero value coefficients exists that is long enough to extends across an entire sub-block, due to run-length encoding, that sub-block will effectively be encoded into a symbol that appears in an earlier sub-sequence, and the sub-sequence will effectively be empty for that block. An EOB marker can be assigned to the same sub-sequence that includes the last encoded non-zero coefficient. As a result, empty sub-sequences or "missing" coefficients do not cause a problem during decoding, as decoding a later sub-sequence will always require decoding all earlier sub-sequences.

Returning to FIG. 3, the sub-sequences generated by the Stream Demultiplexer are stored in an output buffer (step 95). Each of the sub-sequences are typically stored in a designated block of non-volatile memory to enable a decoder to only read and decode the particular encoded sub-sequence(s) that are required for a specific reduced resolution decode. Stream characteristics, such as the number of sub-sequences, starting positions, address offsets and pointers to the encoded coefficients are also stored in the frame header of the encoded blocks, along with other metadata such as DCT and quantization matrices, block size and other information required in the decoding phase.

Depending on the combination of run length coding, entropy encoding and the location of end of block (EOB)

markers, the exemplified encoding method is well suited to manage a wide range of downscaling ratios while maintaining compression efficiency. In addition, run length coding can be performed as if a full block size and standard zigzag ordering are being used. In this regard, run length encoded values are almost invariably included in the sub-sequence where the run starts, however the length can stretch into the next higher sub-sequence, or even across multiple sub-sequences.

The efficiency of the encoding method also arises from the fact that it achieves the same compression ratio as when performed on a full image, but enables measurably faster partial decoding for reduced resolutions.

Figure 6A:
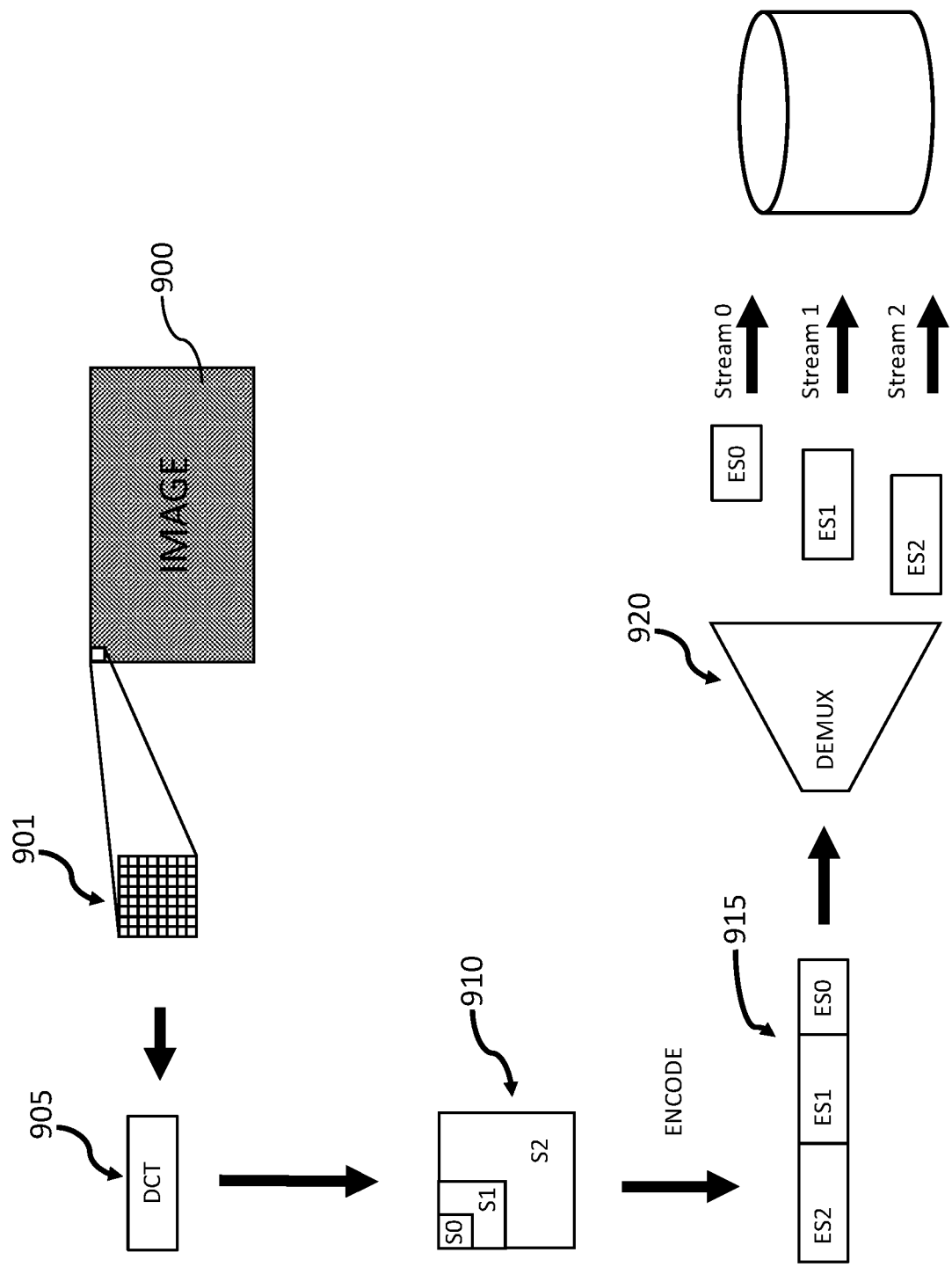
FIGS. 6A and 6B are schematic illustrations of the process of encoding a single spatial block and series of spatial blocks respectively, using the methods described herein.
Figure 6B:
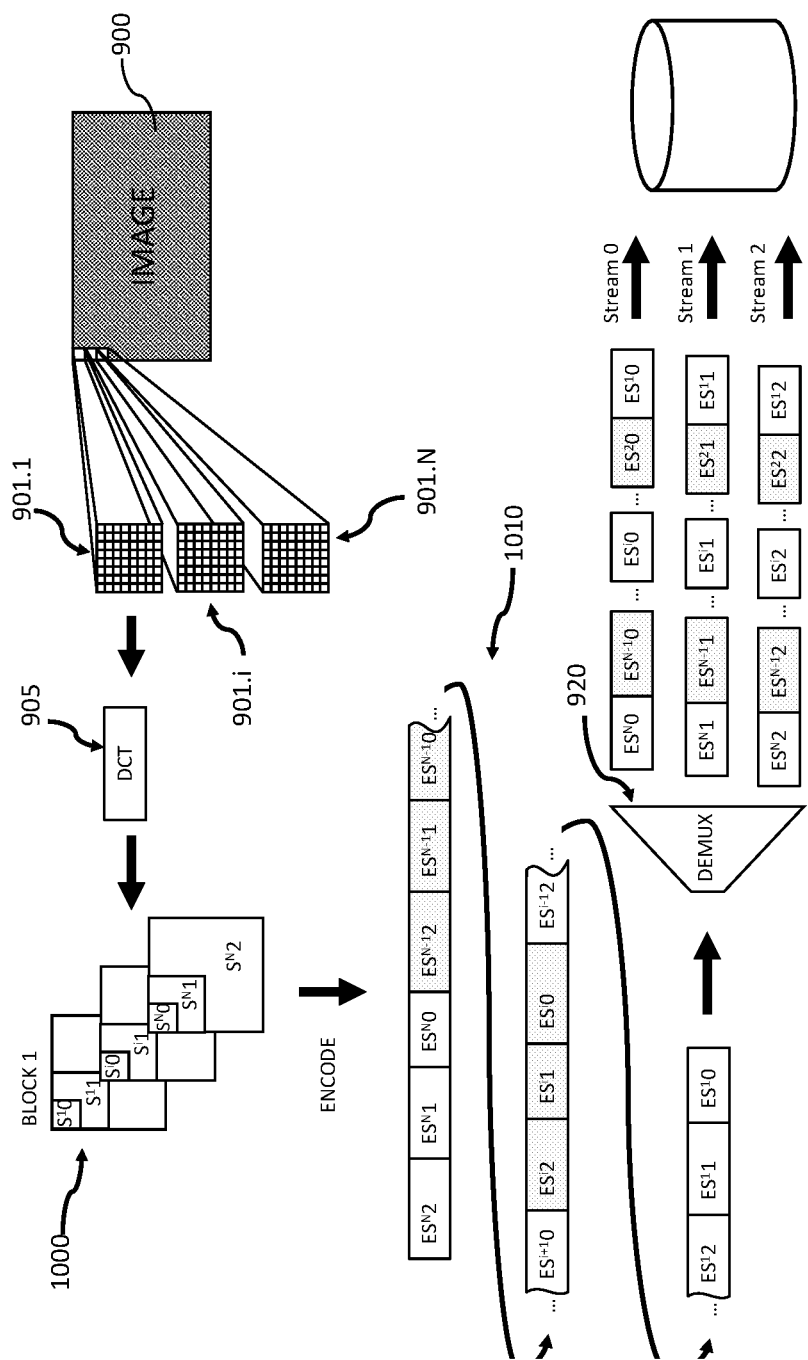

FIGS. 6A and 6B are provided to further aid understanding of aspects of the method of FIG. 3. Turning firstly to FIG. 6A, the operation of an exemplary method on a single block of pixels of an image is shown. The image 900 is divided into spatial blocks (e.g., 901). This then undergoes transformation into the frequency domain using a DCT 905, to generate a block 910 that includes a plurality of DCT coefficients that represent the block 901 within the image 900. Block 910 has the same dimensions (in coefficients) as the block 901 (in pixels). The DCT coefficients are quantized as illustrated in step 60 of FIG. 3. The coefficients are read serially into an encoder which performs entropy encoding in step 80. The order in which the serial stream of coefficients is read into the encoding stage is set in step 70. Preferably the ordering of the coefficients is such that the coefficients within in each of sub-blocks S0, S1 and S2 in DCT block 900 are each contiguous, and most preferably follow the zigzag pattern set out in FIG. 4A or 4B. The serial encoded stream 915 comprises codewords as follows (ordered from earliest to latest) ES0, ES1, ES2 (note that in FIGS. 6A and 6B the stream of codewords is as a queue moving to the right on a first-in, first-out basis, such that the rightmost codeword (ES0 in FIG. 6A) is processed first). This sequence at step 90 (FIG. 3) is passed to the demultiplexer 920 (beginning with ES0) which separates the serial encoded stream into three sub-sequences Stream 0, Stream 1 and Stream 2. The codewords for each sub-sequence can be then be separately buffered (to be followed by corresponding sub-sequence codewords from subsequent blocks), and passed on for further processing, or storage, in a manner that enables them to be processed separately if needed.

FIG. 6B extends FIG. 6A by illustrating the same processing of several blocks 1000 (Blocks 1 ... Block N). The blocks 1 ... N may represent different spatial blocks in the same image, or spatial blocks in different images. For example, successively processed blocks may represent blocks from each image in a set of Y, Cb and Cr component images, or component images from any other color encoding scheme. Each block of DCT coefficients has its coefficients arranged by the ordering step 70 into sub-blocks such that Block 1 has: a sub-block of coefficients Si0 comprising a 2×2 block that includes the DC coefficient; sub-block Si1 which has the next 12 coefficients and completes a 4×4 array when combined with block Si0; and a remaining sub-block of 48 coefficients which complete the 8×8 block. The blocks 1 ... N are encoded to generate a sequence of serially arranged codewords 1010. Block 1 is encoded first as per FIG. 6A, followed by Block 2, continuing through to Block N thus the sequence of serially arranged codewords 1010 comprises encoded sub-blocks as follows (ordered first to last) ES10, ES11, ES12, ES20, ES21, ES22, ... ESi0, ESi1, ESi2, ESN0, ESN1, ESN2, where the superscript denotes the Block number and the Final numeral the sub-block number. As noted above, in FIG. 6B, the sequence of codewords is illustrated as first-in, first-out queue moving towards the multiplexer (i.e., right and down) such that the first codeword in the queue (ES10) is processed first. The sequence of codewords 1010 is then demultiplexed and formed into 3 sub-sequences (corresponding to the three sub-blocks in the ordered coefficients in the Blocks). Sub-sequence 0 includes those codewords that represent each of the coefficients of the S0 sub-blocks S10, S20 ... Si0 ... SN0. Sub-sequence 1 includes those codewords, additional to Sub-sequence 0 that are necessary to represent each of the coefficients of the S1 sub-blocks S11, S21 ... Si1 ... SN1. Stream 3 includes those codewords that, additional to sub-sequence 1 and 0, are necessary to represent each of the coefficients of the S2 sub-blocks S12, S22 ... Si2 ... SN2. Some embodiments of the present disclosure find application in storing a lower resolution image (achieved by storing only selected sub-sequences), thus enabling more images or longer video sequences to be stored in the same amount of memory.

Figure 7:
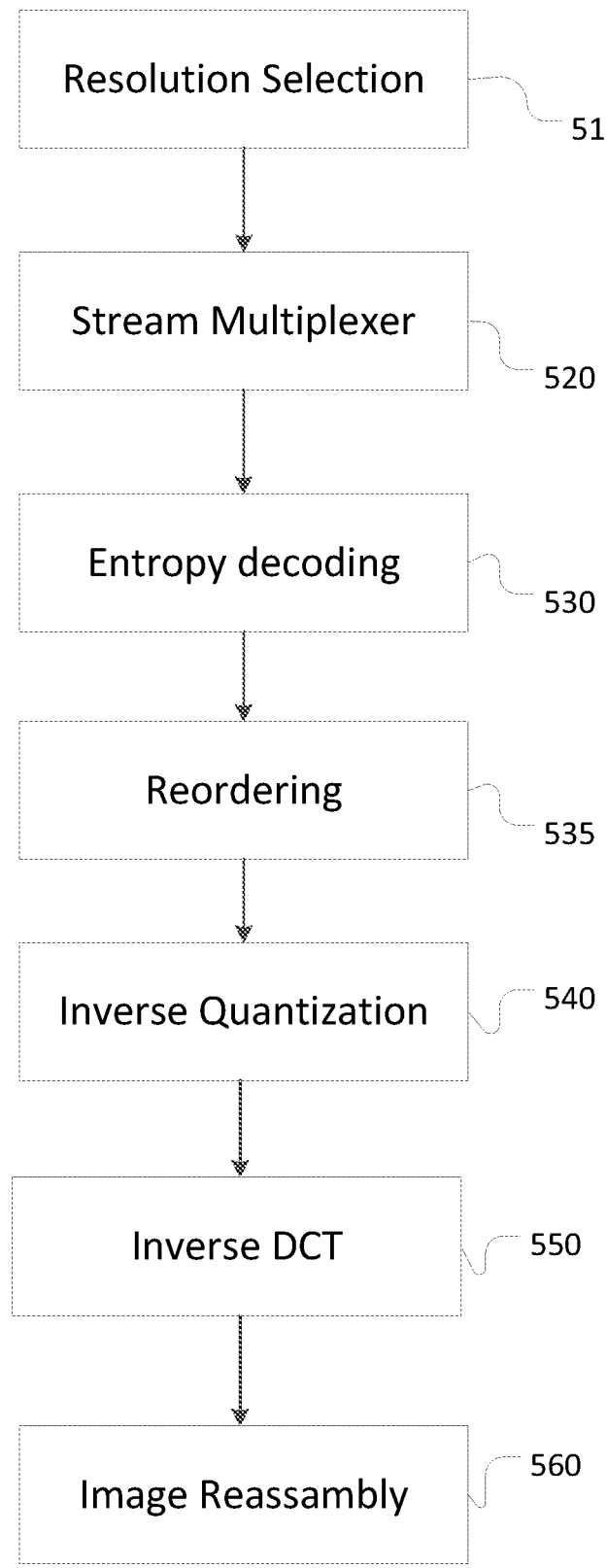
FIG. 7 is a flow chart of the decoding phase of a method in accordance with an embodiment of the present disclosure.

The decoding phase 110 of the method according to an embodiment of the current disclosure is illustrated by the flowchart of FIG. 7. Decoding is performed on an encoded image file produced during the encoding phase as set out herein.

At step 510, the resolution of the image to be decoded is selected. This selection may be an active selection, whereby a user chooses the resolution at which the image is to be generated, or may be a passive selection in the sense that a certain downstream process only needs, or permits, use of an image of a certain resolution, e.g., decoding an image for display on a low resolution monitor. As discussed above, image data is encoded and stored in a manner which facilitates enhanced decoding, in that only the image data required to generate an image at a desired resolution is decoded. For example, the image data can be decoded with a downscaling ratio of 1/2, which for an 8×8 block size, involves solely decoding a smaller dimension block measuring 4×4. Likewise, a 12×12 block size decoded at 1/2 scale ratio involves decoding only a reduced 6×6 block size.

Generally, any fixed integer ratio of k/N can be used as a downscaling ratio, with N being the block size used to encode the image data, and k being an integer ranging from 1 ... N.

After resolution selection, those sub-sequences needed to attain the selected resolution are accessed (e.g., read from memory) and are passed through a Stream Multiplexer (step 520) to generate a serial stream of codewords from which the selected resolution image can be decoded. For example, to decode the image 45 (FIG. 5) that was encoded using an 8×8 block, at a 1/2 downscale ratio, sub-sequences S0 and S1 are selected. As noted above, these sub-sequences collectively contain the 16 encoded coefficients from a 4×4 sub-block.

Likewise, to decode an 8×8 block at a 1/4 scale ratio, only sub-sequence S0 (which contains four encoded symbols in a 2×2 grid) need be selected.

At step 530, the retrieved sub-sequence(s) are entropy decoded. Decoding Huffman-encoded data is typically on a word-by-word basis by reference to a codebook. This is necessary, as each unique codeword can only be distinguished from the other words in the coding alphabet by decoding at the individual bit level. It is not typically possible to commence decoding at an arbitrary location in an encoded bitstream due to these characteristics of the encoding scheme. The encoded bitstream itself does not provide information about where to start decoding or when to move on to the next block, unless the previous block is decoded completely. As such, the decoding commencement point is usually retrieved from the image metadata, which then commences the sequential decoding.

Although it is technically feasible to store additional information about the encoded stream (either in metadata or in the stream itself), such as additional decoding commencement points, this tends to increase the size of the encoded bitstream and thus adversely impacts on the compression efficiency.

Any run-length encodings applied to the data prior to Huffman encoding are reversed during the decoding step. Entropy decoding 530 yields a collection of reduced resolution DCT blocks, each comprising a matrix of quantized DCT coefficients.

At step 535, the quantized DCT coefficients of each block are re-ordered (i.e., 'dezigzagged') back into the original order prior to performing step 70 above, if a non-standard zigzag pattern was used during encoding.

Inverse quantization (step 540) is then performed on each block of quantized DCT coefficients. Inverse quantization involves reversing, as far as is possible, the quantization step (step 60) of the encoding phase. It is performed with reference to the same quantization matrix selected for use in quantization (step 60). The de-quantized DCT blocks thus produced, closely (but not exactly) resemble the original DCT coefficient matrix—namely that produced during the DCT step (step 50). In turn, the DCT coefficient matrix is a representation of the original image file in the frequency domain.

After decoding, the DCT coefficient matrix undergoes Inverse DCT (step 550). The process proceeds by initially taking the two-dimensional inverse DCT of the matrix, rounding the results to integer values and shifting the integer values to restore the original data range.

Subsequent to Inverse DCT, an image is reproduced (step 560) from the data produced during inverse DCT. As noted above, this decoded image has a reduced resolution at the scale ratio selected at step 510 above. However, it will be appreciated that this image is produced by decoding only the required transform coefficients. In other words, the coefficients in sub-sequences that are not required to produce the image at the selected resolution, are not decoded. In the event that an image is not represented with a sub-sequence exactly corresponding with a desired downscaling ratio, embodiments of the present disclosure still may present an advantage over convention image decoding. In a conventional scheme, the whole image needs to be decoded, whereas with an embodiment of the present disclosure only those sub-sequences of codewords needed to decode the desired number (and pattern) of transform coefficients need to be decoded.

Figure 8A:
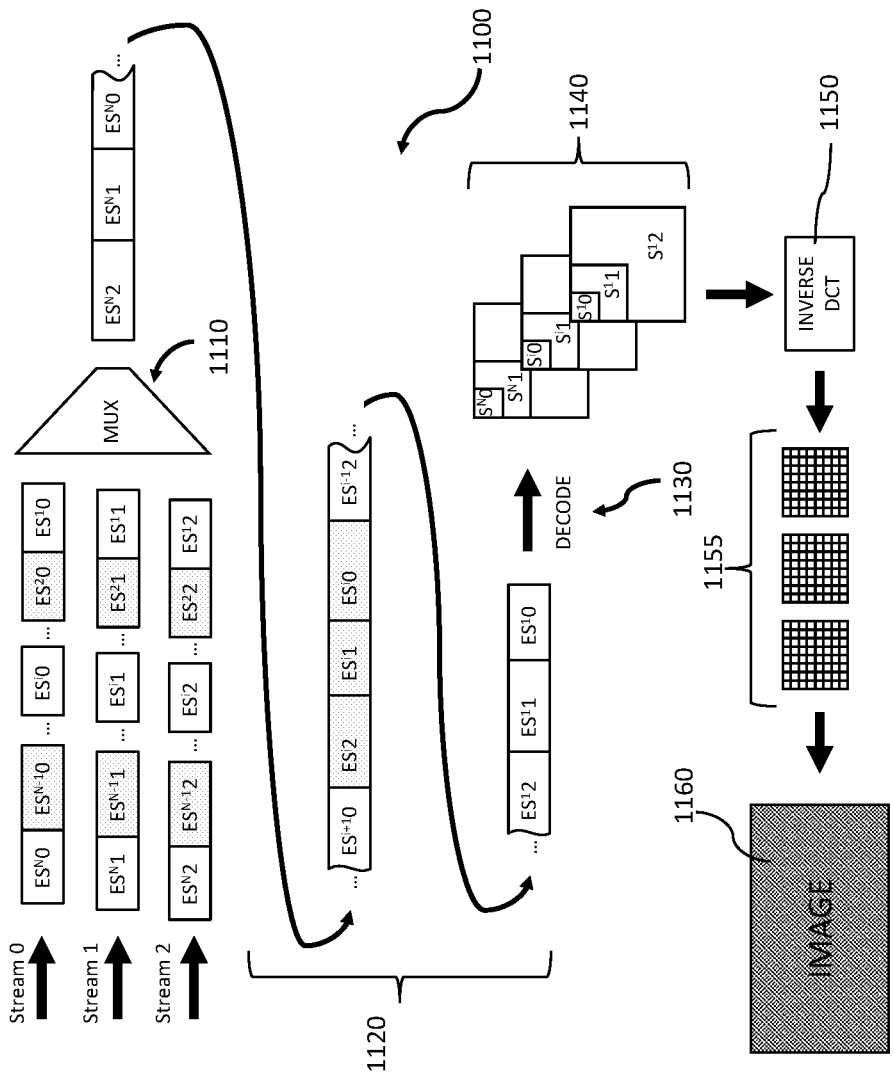
FIGS. 8A, 8B, and 8C are schematic illustrations of the process of decoding an image data to generate a full resolution image, a low resolution image; and an image of intermediate resolution respectively, using the methods described herein.
Figure 8B:
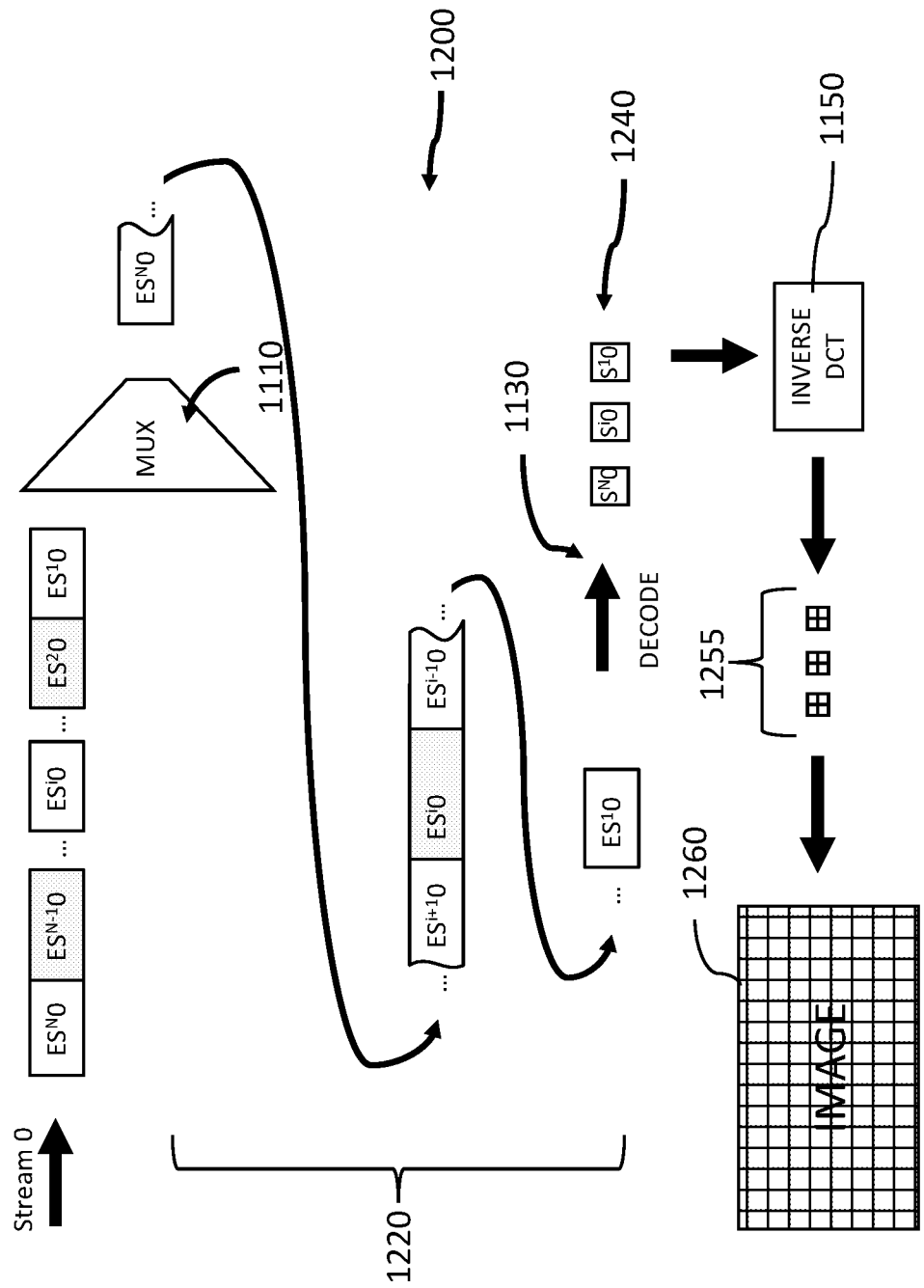
Figure 8C:
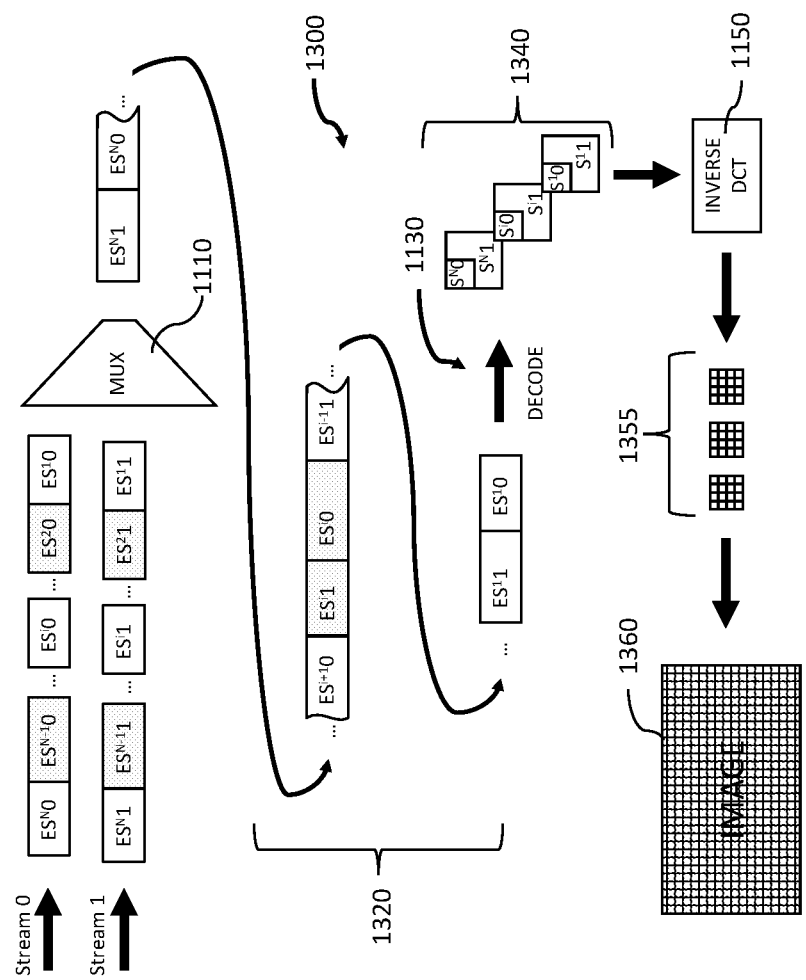

A series of three examples are provided in FIGS. 8A to 8C which show how an embodiment can be used for generation of a full resolution image (FIG. 8A); generation of a low resolution image (FIG. 8B), and generation of an image at an intermediate resolution (FIG. 8C).

The image being generated, was encoded using 8×8 pixel blocks creating N blocks of pixels. During encoding, the spatial-domain pixel blocks are converted into frequency-domain blocks using an 8×8 DCT, the resulting coefficient blocks have their coefficients ordered according to the modified zigzag pattern of FIG. 4A. The sub-blocks of the arrangement of FIG. 4A are encoded and arranged into corresponding sub-sequences of encoded data (Stream 0, Stream 1, Stream 2) as described above and illustrated as queues of codewords moving to the right. The three sub-sequences of encoded data may be stored together or separately to each other. Moreover, each sub-sequence may be received via a different data transmission channel, or received serially on a single channel.

Turning firstly to FIG. 8A, because a full resolution image is to be generated (i.e., the selected resolution is full resolution) all of the sub-sequences of encoded data (Stream 0, Stream 1, Stream 2) need to be processed. Thus the method 1100 begins with all three sub-sequences Stream 0, Stream 1 and Stream 2 being acquired (e.g., received via a transmission channel or accessed from memory or read from a buffer, etc.). These are passed (preferably as queues of codewords illustrated in the figure as queues moving to the right, with the rightmost codeword processed first) to the stream multiplexer 1110 to generate a serially arranged sequence 1120 of codewords. The stream multiplexer 1110 outputs a serial sequence of codewords preferably as follows (ordered first to last) ES10, ES11, ES12, ES20, ES21, ES22, ESi0, ESi1, ESi2, ESN0, ESN1, ESN2, where the superscript denotes the Block number and the Final numeral the sub-block number. Again this sequence is illustrated in FIGS. 8A to 8C as a queue moving away from the stream multiplexer such that ES10 is processed first.

The sequence of codewords are then decoded 1130 into a plurality of blocks 1140 of DCT coefficients. The blocks of coefficients are sized to enable a full resolution image to be created, which entails the DCT blocks to match the size of the array of pixels that it encodes. The DCT blocks 1140 contain DCT coefficients in the order chosen during encoding. In this example, they are arranged according to the modified zigzag ordering 45 of FIG. 4. These are then arranged into an order permitting application of an inverse transform to them. Next an inverse DCT 1150 is applied to each of the blocks 1140 to create corresponding 8×8 pixel blocks 1155. The recreated pixel blocks 1155 can then be assembled and processed into a final image at full resolution 1160.

Now turning to FIG. 8B, which shows a similar diagram to that of FIG. 8A, but for a situation in which recreation of a low resolution image is desired. Because a low resolution image is to be generated fewer than all of the sub-sequences of encoded data need to be processed. In this example, we assume that a ¼ resolution image is to be generated, thus the method 1200 begins with all only sub-sequence Stream 0 being acquired (e.g., received via a transmission channel or accessed from memory or read from a buffer, etc.). The codewords can be passed to the stream multiplexer 1110 to generate a serially arranged sequence 1120 of codewords. However, given that no multiplexing is actually performed in this example, the stream multiplexer 1110 may be omitted. The resulting stream of codewords 1220 is then decoded 1130 to create a series of DCT blocks 1240 having the same dimensions as the S0 block of FIG. 4A, i.e., 2×2. The DCT coefficients are rearranged into standard ordering if needed, and an inverse DCT is applied to each of the blocks 1240 to create corresponding 2×2 pixel blocks 1255. Because the blocks of DCT coefficients 1240 are ¼ the size of the full resolution block, only a 2×2 IDCT need be applied to generate each 2×2 pixel sub-image 1255. The recreated pixel blocks 1155 can then be assembled and processed into a final image 1260 at ¼ resolution of the original.

Now turning to FIG. 8C, which shows a similar diagram to that of FIGS. 11 and 12, but for a situation in which recreation of a medium resolution image is desired. Because a medium resolution image is to be generated, fewer than all of the sub-sequences of encoded data need to be processed. In this example, we assume that a ½ resolution image is to be generated, thus the method 1300 begins with only two sub-sequences Stream 0 and Stream 1 being acquired (e.g., received via a transmission channel or accessed from memory or read from a buffer, etc.). The codewords can be passed to the stream multiplexer 1110 to generate a serially arranged sequence 1320 of codewords. Stream 2 need not be acquired (e.g., read or received) because it is not needed to generate a ½ resolution image. The resulting stream of codewords 1320 is then decoded 1130 to create a series of DCT blocks 1340 having the same dimensions as the combined S0+S1 block of FIG. 4A, i.e., 4×4. Next an inverse DCT is applied to each of the blocks 1340 to create corresponding 4×4 pixel blocks 1355. Because the blocks of DCT coefficients 1340 are ½ the size of the full resolution block only a 4×4 IDCT need be applied to generate each 4×4 pixel sub-image 1355. The recreated pixel blocks 1355 can then be assembled and processed into a final image 1360 at ½ resolution of the original.

Figure 4C:
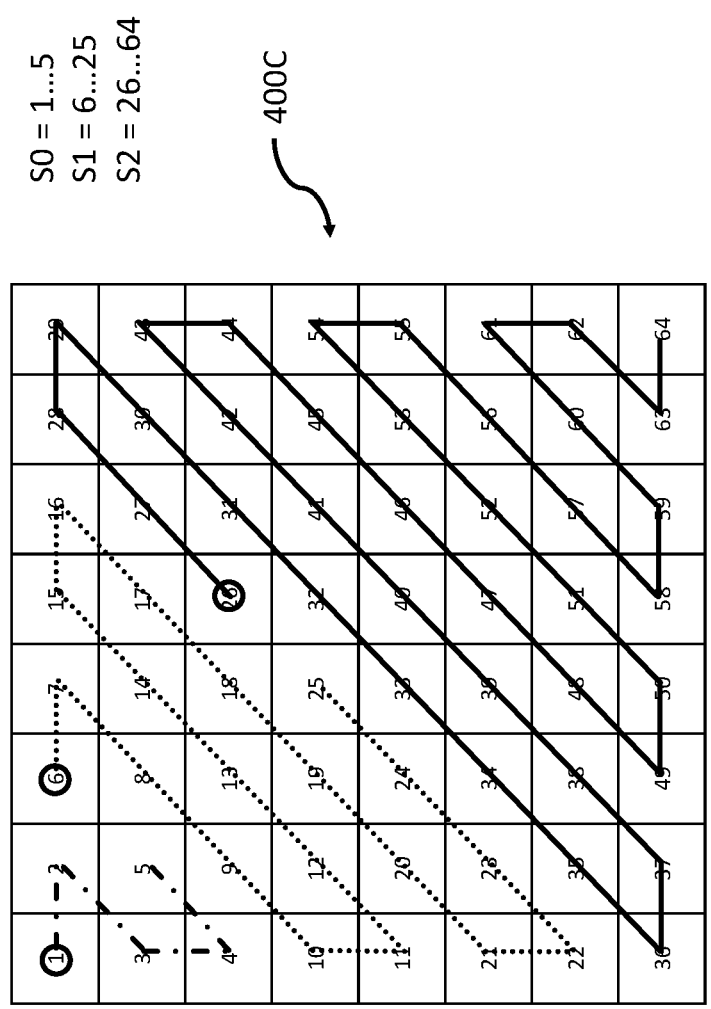
FIGS. 4C and 4D illustrate exemplary conventional zigzag patterns for 8×8 and 12×12 DCT coefficient matrixes, and illustrate how they may be used in embodiments of the present disclosure.
Figure 4D:
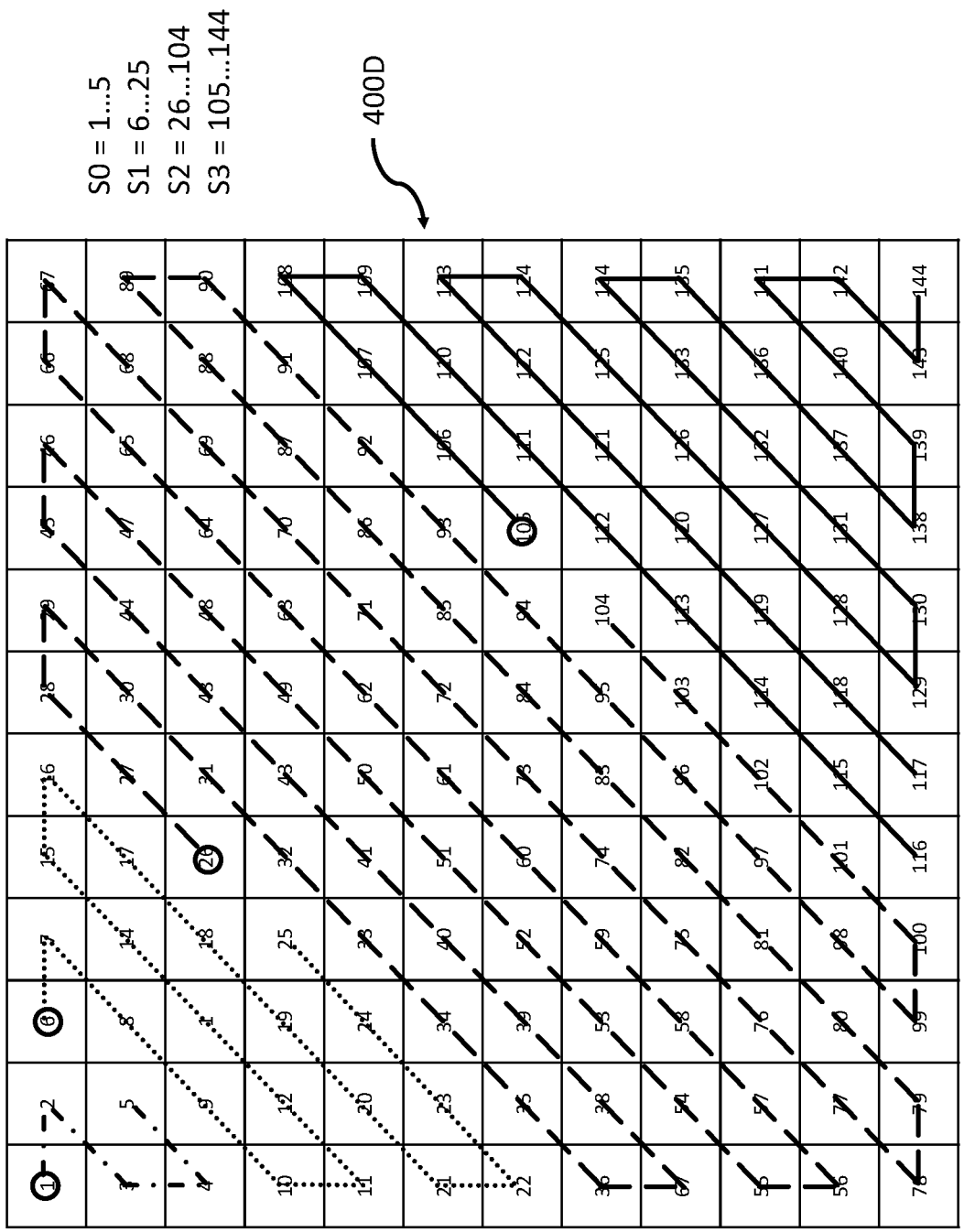

FIGS. 4C and 4D illustrate embodiments using a standard zigzag pattern. In FIGS. 4C and 4D, the blocks 400C & 400D are ordered in step 70 using the standard zigzag pattern, as indicated by the numbering of the blocks' coefficients, and the paths illustrated. These are encoded in step 80, and as per FIG. 3, then demultiplexed by the stream demultiplexer into several streams. Block 400C from FIG. 4C is broken into three sub-sequences as follows:

substream S0—codewords representing coefficients 1 to 5;
substream S1—codewords representing coefficients 6 to 25; and
substream S2—codewords representing coefficients 26 to 64.

By choosing these sub-sequences for demultiplexing the encoded data stream, versions of the image can be conveniently decoded at the following resolutions:

up to a downscaling ratio of 1/4 by accessing and decoding only substream S0;
up to a downscaling ratio of 1/2 of full resolution by additionally accessing and decoding substream S1; and
up to full resolution by additionally accessing and decoding substream S2.

Block 400D from FIG. 4D is broken into four sub-sequences as follows:

substream S0—codewords representing coefficients 1 to 5;
substream S1—codewords representing coefficients 6 to 25;
substream S2—codewords representing coefficients 26 to 104; and
substream S3—codewords representing coefficients 105 to 114.

By choosing these sub-sequences for demultiplexing the encoded data stream, versions of the image can be conveniently decoded at the following resolutions:

up to a downscaling ratio of 1/6 of full resolution by accessing and decoding only substream S0;
up to a downscaling ratio of 1/3 of full resolution by additionally accessing and decoding substream S1;
up to a downscaling ratio of 2/3 of full resolution by additionally accessing and decoding substream S2; and
up to full resolution by additionally accessing and decoding substream S2.

Notwithstanding that this example uses a conventional zigzag ordering for the DCT coefficients, by dividing the data into three sub-sequences which may be separately accessed and decoded, this embodiment offers the ability to generate lower resolution version of the encoded image more economically than a standard decoding process that would require accessing and then decoding of all the encoded stream prior to downscaling.

An example of the encoding method according to an embodiment of the disclosure is illustrated by reference to FIG. 9. A first block 505 and a second block 520 are shown, each of 8×8 dimension. Each block 505 and 520 includes a DC coefficient 'dc0' in the top left hand corner and 63 AC coefficients 'ac1' . . . 'ac63' making up the remainder of the blocks. The AC coefficients are ordered in the modified zigzag ordering discussed above; namely elements in and below the diagonal 525 (ac28-ac35) being in standard zigzag order and the remaining elements being permuted. The blocks 505 and 520 may represent different spatial blocks in the same image or spatial blocks in different images, for example corresponding spatial blocks in related chroma and luma images.

The permutations of the elements for an 8×8 matrix are defined by the following ordering diagram discussed in FIG. 4A.

As noted above, Huffman encoding is deployed to encode the coefficients, where each non-zero coefficient is assigned a binary codeword. Runs of zero value coefficients are typically indicated by the codeword for the next non-zero coefficient (or by the codeword for the end of block).

In the illustrated embodiment, three sub-sequences are created using the 8×8 block generator 45 shown in FIG. 4. The codeword assigned to element ac1 of block 505 is named Y0_ac1_cw, and the codeword assigned to block 520 is named Y1_ac1_cw. The other elements of the two blocks 505 and 520 are named in a like manner. Zero value padding may be inserted at appropriate points in the output, such as at the end of each block, blocks, or each sub-sequence.

The three sub-sequences may be output in any order.

In the scenario where all of the coefficients are non-zero, the content of each sub-sequence produced by the Stream Multiplexer is as follows:

Substream 0: Y0_dc0_cw, Y0_ac1_cw, Y0_ac2_cw, Y0_ac3_cw, Y1_dc0_cw, Y1_ac1_cw, Y1_ac2_cw, Y1_ac3_cw;
Substream 1: Y0_ac4_cw, Y0_ac5_cw, Y0_ac6_cw, Y0_ac7_cw, Y0_ac8_cw, Y0_ac9_cw, Y0_ac10_cw, Y0_ac11_cw, Y0_ac12_cw, Y0_ac13_cw, Y0_ac14_cw, Y0_ac15_cw, Y1_ac4_cw, Y1_ac5_cw, Y1_ac6_cw, Y1_ac7_cw, Y1_ac8_cw, Y1_ac9_cw, Y1_ac10_cw, Y1_ac11_cw, Y1_ac12_cw, Y1_ac13_cw, Y1_ac14_cw, Y1_ac15_cw; and
Substream 2: Y0_ac16_cw, Y0_ac17_cw, Y0_ac18_cw, Y0_ac62_cw, Y0_ac63_cw, Y1_ac16_cw, Y1_ac17_cw, Y1_ac18_cw, Y1_ac62_cw, Y1_ac63_cw.

As noted above, the sub-sequences can be output in any order, and as such, the compressed data stream or file could, for example, comprise Substream 0, then Substream 1, then Substream 2.

In the scenario for example, if all coefficients are non-zero except for ac2, ac3, ac4, and ac5 in block Y0 (505), as per standard Huffman encoding, these zero coefficients are not assigned codewords, but are instead indicated by the codeword for ac6 containing zero run information. The data contents for each sub-sequence is shown below:

Substream 0: Y0_dc0_cw, Y0_ac1_cw, Y0_ac6_cw, Y1_dc0_cw, Y1_ac1_cw, Y1_ac2_cw, Y1_ac3_cw;
Substream 1: Y0_ac7_cw, Y0_ac8_cw, Y0_ac9_cw, Y0_ac10_cw, Y0_ac11_cw, Y0_ac12_cw, Y0_ac13_cw, Y0_ac14_cw, Y0_ac15_cw, Y1_ac4_cw, Y1_ac5_cw, Y1_ac6_cw, Y1_ac7_cw, Y1_ac8_cw, Y1_ac9_cw, Y1_ac10_cw, Y1_ac11_cw, Y1_ac12_cw, Y1_ac13_cw, Y1_ac4_cw, Y1_ac15_cw; and Substream 2: Y0_ac16_cw, Y0_ac17_cw, Y0_ac18_cw, Y0_ac62_cw, Y0_ac63_cw, Y1_ac16_cw, Y1_ac17_cw, Y1_ac18_cw, Y1_ac62_cw, Y1_ac63_cw.

In this scenario, the codeword Y0_ac6_cw has been "promoted" into substream S0. This has the advantage that at decode time, the decoder is able to decode the first four coefficients of DCT block Y0 using only the data in substream S0.

The compressed data stream or file could, in this case, consist of Substream S0, then Substream S1, then Substream S2.

Various aspects and embodiments of the present disclosure are defined in the following clauses.

Clause 1. A method for processing a set of transform coefficients, said transform coefficients being arranged into a plurality of blocks, each block representing a spatial region of an image; and the method comprising:
for each block:
ordering the block's coefficients into a sequence of coefficients;
encoding the ordered sequence of coefficients to yield a sequence of codewords, each codeword including one or more encoded coefficients; and
dividing the sequence of codewords into two or more sub-sequences of codewords.

Clause 2. A method according to clause 1, wherein the number of coefficients in each sub-sequence is at least partly determined by a downscaling ratio.

Clause 3. A method according to either of clauses 1 or 2 wherein dividing the sequence of codewords into two or more sub-sequences of codewords comprises:
defining a first sub-block of transform coefficients based on a first downscaling ratio, and allocating codewords into a first sub-sequence of codewords until the first sub-sequence of codewords contains all codewords needed to recreate the first sub-block of transform coefficients by decoding the first sub-sequence of codewords.

Clause 4. A method according to clause 3 wherein dividing the sequence of codewords into two or more sub-sequences of codewords further comprises:
defining a second sub-block of transform coefficients based on a second downscaling ratio, and allocating codewords, that are not in the first sub-sequence of codewords, to a second sub-sequence of codewords until the combination of the second sub-sequence of codewords and first sub-sequence of codewords contains all codewords needed to recreate the second sub-block of transform coefficients by decoding said combination of codewords.

Clause 5. A method as set out in any one of clauses 1 or 2 which further includes defining a first sub-block of transform coefficients based on a corresponding downscaling ratio and dividing the sequence of codewords to form a first sub-sequence of codewords that contains those codewords necessary to decode the first sub-block of transform coefficients.

Clause 6. A method as set out in clause 5 which further includes defining a second sub-block of transform coefficients based on a corresponding downscaling ratio and dividing the sequence of codewords to form a second sub-sequence of codewords that contains codewords which, when they are combined with the codewords contained within the first sub-sequence of codewords, are necessary to decode the second sub-block of transform coefficients.

Clause 7. A method as set out in clause 6 which further includes defining a third sub-block of transform coefficients based on a corresponding downscaling ratio and dividing the sequence of codewords to form a third sub-sequence of codewords that contains codewords which, when they are combined with the codewords contained within the first and second sub-sequence of codewords, are necessary to decode the third sub-block of transform coefficients.

Clause 8. A method as set out in any one of clauses 5 to 7 which includes dividing the sequence of codewords to form a third sub-sequence of codewords that contains codewords which, when they are combined with the codewords contained within the first and second sub-sequence of codewords, are necessary to decode the third sub-block of transform coefficients.

Clause 9. A method according to any one of clauses 3 to 8 wherein dividing the sequence of codewords into two or more sub-sequences of codewords further comprises allocating remaining codewords corresponding to a block to at least one further sub-sequence of codewords.

Clause 10. A method as set out in any one of clauses 1 to 9 wherein a block of transform coefficients comprises an array of M×N transform coefficients, where N may, or may not, equal M; and at least one of said sub-sequences of codewords represents a sub-block of transform coefficients comprising an array of M/D×N/D transform coefficients, wherein 1/D is a downscaling ratio of the sub-block.

Clause 11. A method as set out in clause 10 wherein dividing the sequence of codewords into two or more sub-sequences of codewords includes: creating a sub-sequence of codewords that include enough codewords to regenerate a sub-block of transform coefficients comprising M/D×N/D transform coefficients, wherein 1/D is a downscaling ratio of the sub-block.

Clause 12. A method according to any one of the preceding clauses, wherein the ordering of each block's coefficients into said sequence of coefficients is a modified zigzag ordering comprising a permuted region and a zigzag-ordered region.

Clause 13. A method according to clause 3, wherein each block is of dimension N×N and the zigzag-ordered region includes the coefficients on and below a diagonal of each block.

Clause 14. A method according to any preceding clause, further including arranging corresponding sub-sequences for the plurality of blocks into a common sub-sequence.

Clause 15. A method according to clause 14 which includes storing an image file containing one or more of said common sub-sequences.

Clause 16. A method as set out in clause 15 wherein the method includes storing a plurality of common sub-sequences in said image file to enable generation of a downscaled image at least one predetermined downscaling ratio that corresponds to a respective common sub-sequences.

Clause 17. A method for decoding an encoded image produced using the method according to any one of the preceding clauses, the method including:
selecting an image resolution;
selecting one or more sub-sequences of codewords suitable to generate an image at the selected image resolution; and
decoding the selected sub-sequences.

Clause 18. A method as set out in clause 17 wherein for each block representing a spatial region of the image, the method includes:

decoding fewer than all of the sub-sequences to produce a sub-block of transform coefficients having fewer transform coefficients than the block prior to encoding.

Clause 19. A method of generating a downscaled image from encoded image data, said encoded image data having been generated by a method as set out in any one of clauses 1 to 17, the method comprising:
selecting an image resolution;
for each block representing a spatial region of the image:
 decoding fewer than all of the sub-sequences of codewords to produce a sub-block of transform coefficients having fewer transform coefficients than the block prior to encoding;
 performing an inverse transformation on the sub-block of transform coefficients using an inverse transformation sized to generate spatial domain image data corresponding to the selected image resolution; and
 processing the spatial domain image data for each sub-block to generate a downscaled image at the selected image resolution.

Clause 20. The method as set out in either of clauses 18 or 19 wherein the sub-block of transform coefficients has a number of coefficients corresponding to the selected image resolution.

Clause 21. The method as set out in any one of clauses 19 or 20 which includes reordering the sub-block of transform coefficients prior to performing the inverse transformation, wherein the reordered sub-block of transform coefficients is in a zigzag pattern.

Clause 22. A non-transitory computer readable medium containing a computer software product including instructions which, when executed by a processor, cause the processor to process a set of transform coefficients, using a method as set out in any one of clauses 1 to 16.

Clause 23. A non-transitory computer readable medium containing a computer software product including instructions which, when executed by a processor, cause the processor to process an image using a method as set out in any one of clauses 17 to 21.

Clause 24. A method for storing a frame of image data, comprising:
transforming the frame of image data into a set of transform coefficients;
performing the method of any one of clauses 1 to 16; and
storing one or more of the sub-sequences of codewords.

Clause 25. The method of clause 24 wherein the one or more sub-sequences of codewords are stored in a manner to facilitate retrieval of selected ones of said sub-sequences of codewords.

Clause 26. A method of recording a moving image, comprising:
capturing, in a camera having an image processing system and a data storage medium, a sequence of frames of image data; and
for a plurality of frames of image data, the image processing system performing a method of clause 24 or 25.

Clause 27. A camera including an image processing system configured to perform a method as set out in any one of clauses 1 to 21, 24, or 25.

Clause 28. An image processing system configured to perform a method as set out in any one of clauses 1 to 21, 24, or 25.

This described embodiments of the disclosure provide a new type of storing compressed image data in form of entropy encoded DCT coefficients by creating multiple sub-sequences. The method can be applied to various DCT block sizes, different coefficient grouping depending on desired downscaling ratios, as well as in combination with different methods of entropy encoding.

It will be understood that the disclosure disclosed and defined in this specification extends to all alternative combinations of two or more of the individual features mentioned or evident from the text or drawings. All of these different combinations constitute various alternative aspects of the disclosure.

The various embodiments described above can be combined to provide further embodiments. All of the U.S. patent application publications and foreign patent applications referred to in this specification and/or listed in the Application Data Sheet are incorporated herein by reference, in their entirety. Aspects of the embodiments can be modified, if necessary to employ concepts of the various applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for processing a set of transform coefficients, said transform coefficients being arranged into a plurality of blocks, each block representing a spatial region of an image, the method comprising:
for each block:
 ordering the block's transform coefficients into an ordered sequence of coefficients;
 encoding the ordered sequence of coefficients to yield a sequence of codewords, each codeword including one or more encoded coefficients; and
 dividing the sequence of codewords into two or more sub-sequences of codewords by defining a first sub-block of transform coefficients based on a first downscaling ratio, and allocating codewords into a first sub-sequence of codewords until the first sub-sequence of codewords contains all codewords needed to recreate the first sub-block of transform coefficients by decoding the first sub-sequence of codewords.

2. The method as claimed in claim 1 wherein a number of coefficients in each sub-sequence is at least partly determined by a downscaling ratio.

3. The method as claimed in claim 1, further including defining a second sub-block of transform coefficients based on a second downscaling ratio, and allocating codewords, that are not in the first sub-sequence of codewords, to a second sub-sequence of codewords until a combination of the second sub-sequence of codewords and the first sub-sequence of codewords contains all codewords needed to recreate the second sub-block of transform coefficients by decoding said combination of codewords.

4. The method as claimed in claim 1 wherein dividing the sequence of codewords into two or more sub-sequences of codewords further comprises allocating remaining codewords corresponding to a block to at least one further sub-sequence of codewords.

5. The method as claimed in claim 1 wherein a block of transform coefficients comprises an array of M×N transform coefficients, where N may, or may not, equal M; and at least one of said sub-sequences of codewords represents a sub-block of transform coefficients comprising an array of M/D× N/D transform coefficients, wherein 1/D is a downscaling ratio of the sub-block.

6. The method as claimed in claim 1 wherein the ordering of each block's transform coefficients into said ordered sequence of coefficients is a modified zigzag ordering comprising a permuted region and a zigzag-ordered region.

7. The method as claimed in claim 1, further including arranging corresponding sub-sequences for the plurality of blocks into a common sub-sequence.

8. The method as claimed in claim 7, further including storing a plurality of common sub-sequences in an image file to enable generation of a downscaled image at least one predetermined downscaling ratio that corresponds to a respective common sub-sequence.

9. A method for decoding an encoded image produced using the method according to claim 1, the method including:
    selecting an image resolution;
    selecting one or more sub-sequences of codewords suitable to generate an image at the selected image resolution; and
    decoding the selected sub-sequences.

10. The method as claimed in claim 9 wherein for each block representing a spatial region of the image the method includes:
    decoding fewer than all of the sub-sequences to produce a sub-block of transform coefficients having fewer transform coefficients than the block prior to encoding.

11. A method for storing a frame of image data, comprising:
    transforming the frame of image data into a set of transform coefficients;
    performing a method as claimed in claim 1; and
    storing one or more of the sub-sequences of codewords.

12. The method as claimed in claim 11 wherein the one or more of the sub-sequences of codewords are stored in a manner to facilitate retrieval of selected ones of said sub-sequences of codewords.

13. A method of recording a moving image, comprising:
    capturing, in a camera having an image processing system and a data storage medium, a sequence of frames of image data; and
    for a plurality of frames of image data, the image processing system performing a method as claimed in claim 11.

14. An image processing system configured to perform a method as claimed in claim 1.

15. A camera including an image processing system as claimed in claim 14.

16. A non-transitory computer readable medium containing a computer software product including instructions which, when executed by a processor, cause the processor to perform a method as claimed in claim 1.

17. A method of generating a downscaled image from encoded image data, said encoded image data representing a set of transform coefficients having been processed such that said transform coefficients are arranged into a plurality of blocks, each block representing a spatial region of an image, the transform coefficients having been arranged into said plurality of blocks using a method comprising:
    for each block:
        ordering the block's transform coefficients into an ordered sequence of coefficients;
        encoding the ordered sequence of coefficients to yield a sequence of codewords, each codeword including one or more encoded coefficients; and
        dividing the sequence of codewords into two or more sub-sequences of codewords;
    said method of generating a downscaled image from said encoded image data comprising:
    selecting an image resolution; and
    for each block representing a spatial region of the image:
        decoding fewer than all of the sub-sequences of codewords to produce a sub-block of transform coefficients having fewer transform coefficients than the block prior to encoding;
        performing an inverse transformation on the sub-block of transform coefficients using an inverse transformation sized to generate spatial domain image data corresponding to the selected image resolution; and
        processing the spatial domain image data for each sub-block to generate a downscaled image at the selected image resolution.

18. The method as claimed in claim 17 wherein the sub-block of transform coefficients has a number of coefficients corresponding to the selected image resolution.

19. The method as claimed in claim 17, further including reordering the sub-block of transform coefficients prior to performing the inverse transformation, wherein the reordered sub-block of transform coefficients is in a zigzag pattern.

20. An image processing system configured to perform a method as claimed in claim 17.

21. A camera including an image processing system as claimed in claim 20.

22. A non-transitory computer readable medium containing a computer software product including instructions which, when executed by a processor, cause the processor to perform a method as claimed in claim 17.

23. The method as claimed in claim 17 wherein said encoded image data representing a set of transform coefficients have been processed by dividing the sequence of codewords into two or more sub-sequences of codewords by defining a first sub-block of transform coefficients based on a first downscaling ratio, and allocating codewords into a first sub-sequence of codewords until the first sub-sequence of codewords contains all codewords needed to recreate the first sub-block of transform coefficients by decoding the first sub-sequence of codewords.

* * * * *